United States Patent
Mubeen et al.

(10) Patent No.: US 12,073,227 B2
(45) Date of Patent: Aug. 27, 2024

(54) ENERGY-EFFICIENT CORE VOLTAGE SELECTION APPARATUS AND METHOD

(71) Applicant: Intel Corporation, Santa Clara, CA (US)

(72) Inventors: Noor Mubeen, Bangalore (IN); Ashraf H. Wadaa, Beaverton, OR (US); Andrey Gabdulin, Ramat-Gan (IL); Russell Fenger, Beaverton, OR (US); Deepak Samuel Kirubakaran, Hillsboro, OR (US); Marc Torrant, Folsom, CA (US); Ryan Thompson, Beaverton, OR (US); Georgina Saborio Dobles, Pavas (CR); Lingjing Zeng, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 606 days.

(21) Appl. No.: 17/131,547

(22) Filed: Dec. 22, 2020

(65) Prior Publication Data
US 2022/0058029 A1    Feb. 24, 2022

Related U.S. Application Data

(60) Provisional application No. 63/069,622, filed on Aug. 24, 2020.

(51) Int. Cl.
*G06F 9/4401*  (2018.01)
*G06F 9/38*  (2018.01)
*G06F 9/50*  (2006.01)

(52) U.S. Cl.
CPC .......... *G06F 9/4405* (2013.01); *G06F 9/3877* (2013.01); *G06F 9/4403* (2013.01); *G06F 9/5094* (2013.01)

(58) Field of Classification Search
CPC .... G06F 9/4405; G06F 9/3877; G06F 9/4403; G06F 9/5094
See application file for complete search history.

(56) References Cited

U.S. PATENT DOCUMENTS

| | | | | |
|---|---|---|---|---|
| 6,496,881 B1 * | 12/2002 | Green | ................. | G06F 11/0724 714/24 |
| 2014/0281457 A1 * | 9/2014 | Weissmann | ......... | G06F 9/45558 713/2 |

(Continued)

FOREIGN PATENT DOCUMENTS

WO    WO-2015183268 A1 *  12/2015  ............... G06F 1/26

OTHER PUBLICATIONS

"Intel Architecture Instruction Set Extensions and Future Features Programming Reference", <https://software.intel.com/sites/default/files/managed/c5/15/architecture-instruction-set-extensions-programming-reference.pdf> Mar. 2020, 137 pgs.

(Continued)

*Primary Examiner* — Zhipeng Wang
(74) *Attorney, Agent, or Firm* — NICHOLSON DE VOS WEBSTER & ELLIOTT LLP

(57) ABSTRACT

A processor core energy-efficiency core ranking scheme akin to a favored core in a multi-core processor system. The favored core is the energy-efficient core that allows an SoC to use the core with the lowest $V_{min}$ for energy-efficiency. Such $V_{min}$ values may be fused in appropriate registers or stored in NVM during HVM. An OS scheduler achieves optimal energy performance using the core ranking information to schedule certain applications on the core with lowest $V_{min}$. A bootstrap flow identifies a bootstrap processor core (BSP) as the most energy efficiency core of the SoC and assigns that core the lowest APIC ID value according to the lowest $V_{min}$. Upon reading the fuses or NVM, the microcode/BIOS calculates and ranks the cores. As such, (Continued)

microcode/BIOS calculates and ranks core APIC IDs based on efficiency around LFM frequencies. Based on the calculated and ranked cores, the microcode or BIOS transfers BSP ownership to the most efficiency core.

20 Claims, 9 Drawing Sheets

(56) References Cited

U.S. PATENT DOCUMENTS

| | | | | |
|---|---|---|---|---|
| 2014/0325183 A1* | 10/2014 | Rozen | ............ | G06F 9/5094 |
| | | | | 712/30 |
| 2017/0357298 A1* | 12/2017 | Hovis | ............ | G06F 1/324 |
| 2021/0124594 A1* | 4/2021 | Rajagopal | ............ | G06F 9/4403 |

OTHER PUBLICATIONS

"Static configuration options for core parking overview", <https://docs.microsoft.com/en-us/windows-hardware/customize/power-settings/static-configuration-options-for-core-parking> Mar. 20, 2020, 2 pgs.

Powell et al., "Camp: A Technique to Estimate Per-Structure Power at Run-time using a Few Simple Parameters", 15th International Symposium on High-Performance Computer Architecture, 2009, 12 pages.

* cited by examiner

ENERGY-EFFICIENT CORE VOLTAGE SELECTION APPARATUS AND METHOD

CLAIM OF PRIORITY

This application claims priority of U.S. Provisional Application Ser. No. 63/069,622 titled "ENERGY-EFFICIENT CORE VOLTAGE SELECTION APPARATUS AND METHOD" filed Aug. 24, 2020, which is incorporated by reference in its entirety.

BACKGROUND

For powered-on voltage-frequency controlled domains, such as central processing unit (CPU), graphics processing unit (GPU), and other intellectual property (IP) blocks in a system-on-chip (SoC), the minimum applicable voltage of the power supply differs at each operating frequency. This voltage is referred herein as $V_{min}$. Below such $V_{min}$ value, the transistor digital logic is error prone and hence, the circuit is deemed to be non-functional. Such a $V_{min}$ is determined at manufacturing test process by High Volume Manufacturing (HVM). The $V_{min}$ voltage may be influenced by other silicon attributes such as Inverse Thermal Dependence (ITD). Within a same wafer, the $V_{min}$ value may differ from die-to-die or within a die differ from processor core to processor core.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
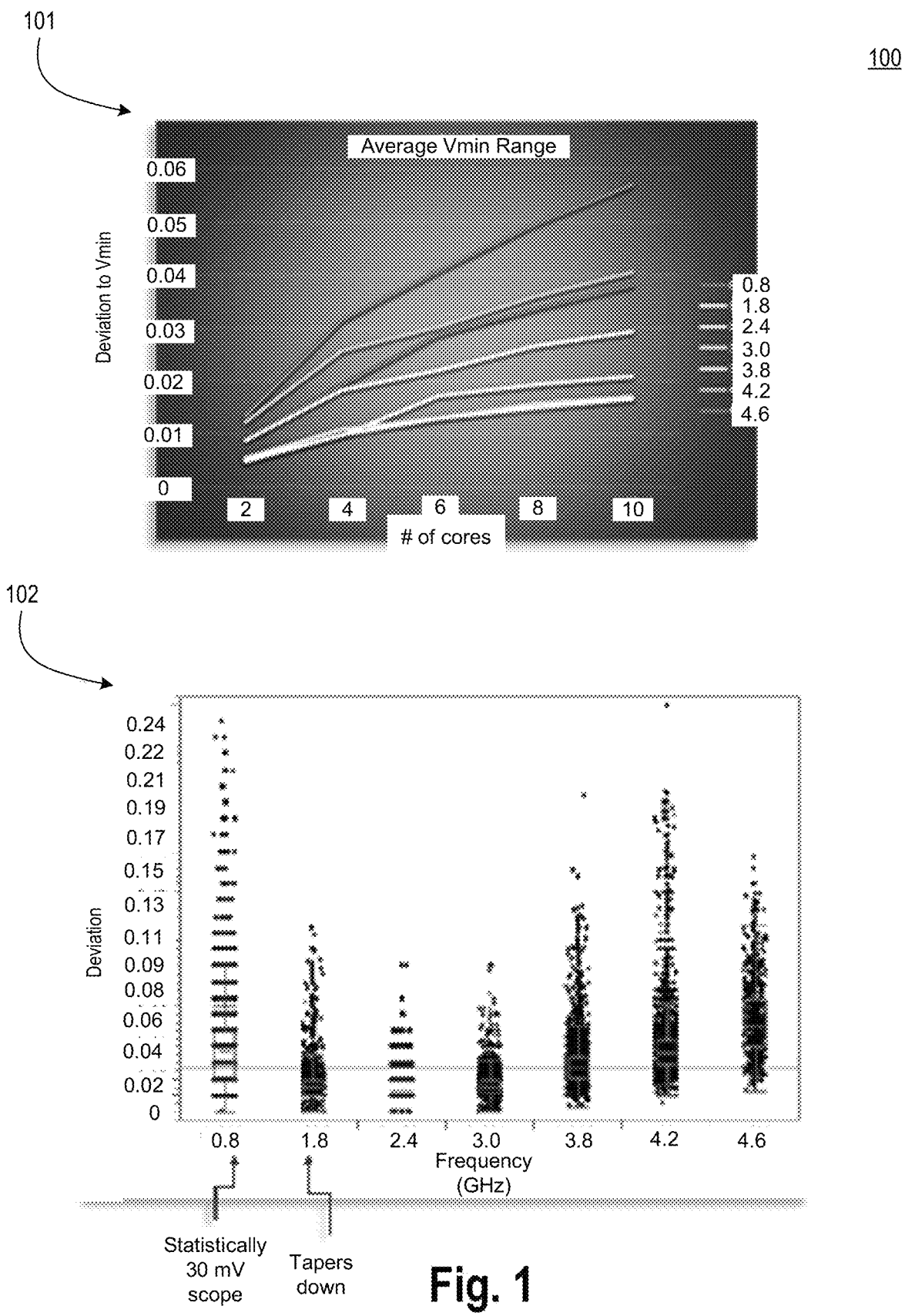
FIG. 1 illustrates a set of plots showing $V_{min}$ deviation range for various frequency bins and for number of processor cores in a system-on-chip (SoC).

In multi-processors (MP) systems, at present, active processor cores cumulatively consume higher power than what is otherwise necessary to run each of processor core at their respective per-core $V_{min}$ voltage. This is due to the following reasons. First, most platforms do not have per-processor core voltage-regulator (VR) control domain. For example, the VR output and hence control may be clubbed across two or more processor cores. Second, for Per-Core Performance State (PCPS) platforms, differential frequency of operations across cores is allowed. However, the higher of the voltage (maximum among core $V_{min}$) is realized as the $V_{min}$ for the SoC at any given frequency. Third, for platforms that support per-core voltage domain, the per-core $V_{min}$ as HVM feature may not be available.

Various embodiments leverage $V_{min}$ differences across processor cores to ultimately deliver optimal battery life and responsiveness. Based on statistical data, it is observed that differential $V_{min}$ for lower-power, low-frequency workloads can be in the order of approximately 30 mV, for example. For real-life battery life influencing workloads, this can translate up to about 8% saving in SoC power, for example. Some embodiments use a processor core energy-efficiency core ranking scheme. This is akin to a favored core approach in a multi-core processor system. However, the favored core here is the energy-efficient core that allows the SoC to use the core with the lowest $V_{min}$ for energy-efficiency. The gains are specific to low-power consumption scenarios. Such $V_{min}$ values may be stored in appropriate registers during the HVM process. For example, $V_{min}$ values may be stored in a fuses, non-volatile memory (NVM), programmable registers, etc. In some embodiments, an operating system (OS) scheduler can achieve optimal energy performance using the core ranking information to schedule certain applications on the core with lowest $V_{min}$.

Some embodiments provide a mechanism to lower average power of the SoC by taking advantage of core-to-core $V_{min}$ variation emanating from an HVM process-logic change to capture the difference in fuses (or any suitable non-volatile memory) that store per core $V_{min}$ values. Based on this silicon novelty, when operating at or near low frequency mode (LFM) and efficient frequencies ($P_e$), lower power can be achieved for the SoC. Efficient frequency in the LFM range is from 400 MHz to 1 GHz, for example. This is relevant to real-world usage scenarios, as telemetry data indicates high residency in lower frequency ranges. In some embodiments, the SoC exposes energy efficiency information, in lower or other specific range of frequencies, as applicable per-core, to the OS. In some embodiments, the OS is enabled with energy-aware scheduling schemes that incorporate $V_{min}$ considerations (e.g., efficient core for handling low utilization interrupt and deferred procedure call (DPC) servicing).

Processor DPC time is the time that processor spent receiving and servicing DPCs. DPCs are interrupts that run at a lower priority than standard interrupts. Percentage DPC time is a component of percentage privileged time because DPCs are executed in a privileged mode. If a high percentage DPC time is sustained, there may be a processor bottleneck or an application or hardware related issue that can significantly diminish overall system performance.

There are many technical effects of the various embodiments. For example, the energy-efficient core voltage selection scheme does not involve a compromise or trade-off to performance in the process of lowering the average power. On the contrary, selecting optimal $V_{min}$ helps improve performance from higher turbo residency in certain scenarios. The scheme of various embodiments leverages silicon characteristic goodness in HVM process, to ultimately delivering competitive advantage that can even be deployable as out-of-box without mandating software changes. The scheme leverages an HVM process that has well-established means to identify such per-core differentiation in $V_{min}$. The scheme maintains the compatibility to stress and reliability requirements of the SoC. Other technical effects will be evident from the various figures and embodiments.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

FIG. 1 illustrates a set of plots 100 showing $V_{min}$ range for various frequency bins and for number of processor cores in a system-on-chip (SoC). An example of the SoC is described with reference to FIG. 9. Referring back to FIG. 1, various embodiments describe a feature that taps newer source of power saving by combining hardware feature of per-core $V_{min}$ along with software scheduling optimizations. The set of plots 100 illustrate plot 101 showing range of deviations in $V_{min}$ for various frequency bins in an SoC as determined using high volume manufacturing. Plot 102 plot illustrates statistics regarding $V_{min}$ margins that are achievable on significant units. The margin bars in plot 102 show feasibility of up to 30 mV reduction in floor $V_{min}$ at 800 MHz. This margin tapers away from the low frequency mode (LFM) range (1.8 GHz). A similar trend is observed at the turbo region.

Figure 2:
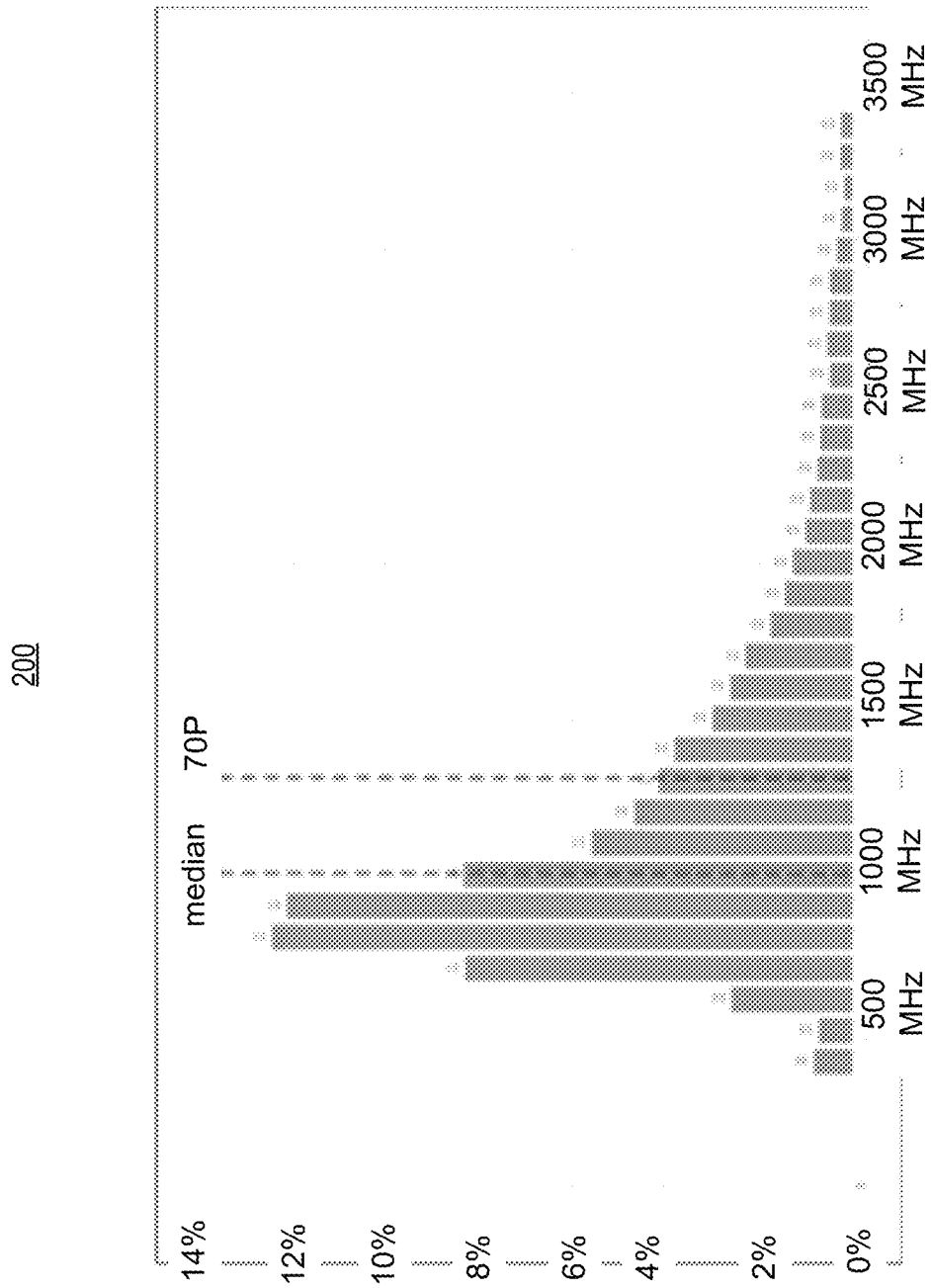
FIG. 2 illustrates a histogram showing average frequency distribution in real-life usage.

FIG. 2 illustrates histogram 200 showing average frequency distribution. Chip vendors and operating system developers (e.g., Intel and Microsoft, respectively) collect and assimilate telemetry data from the real deployments. In one example, the source of data is Microsoft inbox data collectors on Windows® and Microsoft® surface devices. In one case, a data gathered based on a sample-space of 700 plus real-world devices, indicates that the median utilization levels are less than 70%, with Background Activity Monitor (BAM) based workloads cumulatively spanning greater than 10%. Insight into low-power background activity is significantly higher than the assumptions based on lab data. Windows operating system (OS) tracks and tags background activity at run-time and indicates the platform to lower the QoS (quality-of-service) levels. Presently, this also translates to a run-time cap on p-state, for example, within 1.5 GHz for the processor.

Given these telemetry indicators, some embodiments use per-core $V_{min}$ voltages for p-state below 1.5 GHz to enhance energy efficiency. While various embodiments are extensible to the Turbo region, the embodiments described herein and their results are centered around LFM bound battery-life influencing workloads.

The instantaneous dynamic power of a processor is a proportional to frequency and corresponding voltage ($V_{cc}$) squared (approximately), at that instance. In a multi-core environment, presently, all cores employ a common $V_{min}$ at a given p-state. However, employing a $V_{min}$ per-core can result in a lowest $V_{min}$ that is lowered up to 30 mV at LFM region, for example. Employing a $V_{min}$ per-core can translate up to 8% saving, for example, for background activity because lower $V_{min}$ can be realized compared to using a single $V_{min}$ for all cores.

Supported by HVM statistics, the following experiment translates this to actual benefits at SoC power. Here, the voltage-frequency (VF) curve is updated to create a delta that indicates the benefits of per-core $V_{min}$. In one example, VF benefits are limited to a conservative 1.3 GHz. Note that ideally the updated VF should be lowered by observed margin. However, to avoid system instability and crashes, the delta is reversed without much concern on relative percent benefit analysis. Further, the simulated setup applies the new voltage to cores. This is an ideal benefit which can be realized when the software-based scheduling coordinates to select the best (energy efficient) core as exposed to the OS by the Hardware-Capabilities ranking of cores.

In some embodiments, fuse(s) or non-volatile memory are updated or programmed with per-core $V_{min}$ as a part of High-Volume Manufacturing (HVM) process and associated tooling changes. As such, new $V_{min}$ per core is qualified. In this HVM setup several, low-power and/or low-QoS workload are executed on the cores, and $V_{min}$ per core recorded. In some embodiments, per-core $V_{min}$ is transmitted over any suitable communication media (e.g., internet) to firmware instead or in addition to reading from fuses or NVM. Examples of NVM include ferroelectric memory, phase change memory, magnetic memory, resistive memory, flash memory, etc.

The results in Table 1 are based on three run geo-mean scores on a computer platform.

TABLE 1

| Workload scenario | SoC power reduction (%) |
| --- | --- |
| VPB local (HoBL) | 2.89% |
| HoBL productivity | 2.72% |
| EEMBC browsing | 6.04% |
| HoBL Display idle | 5.19% |
| Background Cinebench (CB) ST | 8.92% |
| Background CB MT | 4.04% |
| Background Defender (Windows Defender scan) | 5.10% |

As expected, the benefit (e.g., percent savings) improve for background activity. Above results are without any software scheduling changes and assumes a common VF curve across cores. The software changes are considered in alternate solution options described herein.

Figure 3:
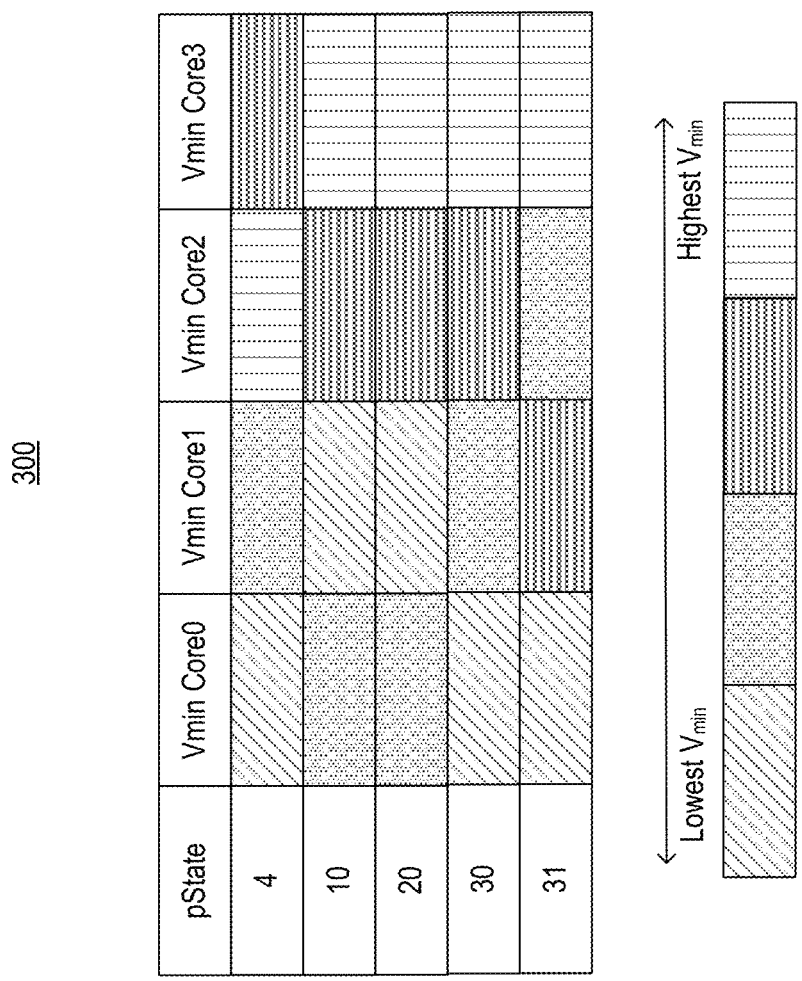
FIG. 3 illustrates an array of relative $V_{min}$ per processor core, per-frequency for various p-states.

FIG. 3 illustrates array 300 of $V_{min}$ per core, per-frequency for various p-states. FIG. 3 depicts pattern coded values that are interpreted per p-state row. P-states are states for optimizing of the voltage and CPU frequency during operation. During the execution of code, the operating system and CPU can optimize power consumption through different e-states (performance states). Depending on the requirements, a CPU is operated at different frequencies. P0 is the highest frequency (likely with the highest voltage).

HVM programs the VF fuses or non-volatile memory with $V_{min}$ values. For example, the pattern coded values can be a 5-point tuple of {P-state, $V_{min}$}. Manufacturing test flows typically determines the best $V_{min}$ per frequency for a given part (e.g., SoC with multiple cores). When per-core $V_{min}$ is enabled in HVM, the relative $V_{min}$ delta fuses (or NVM) are also programmed for per-core $V_{min}$.

Figure 4:
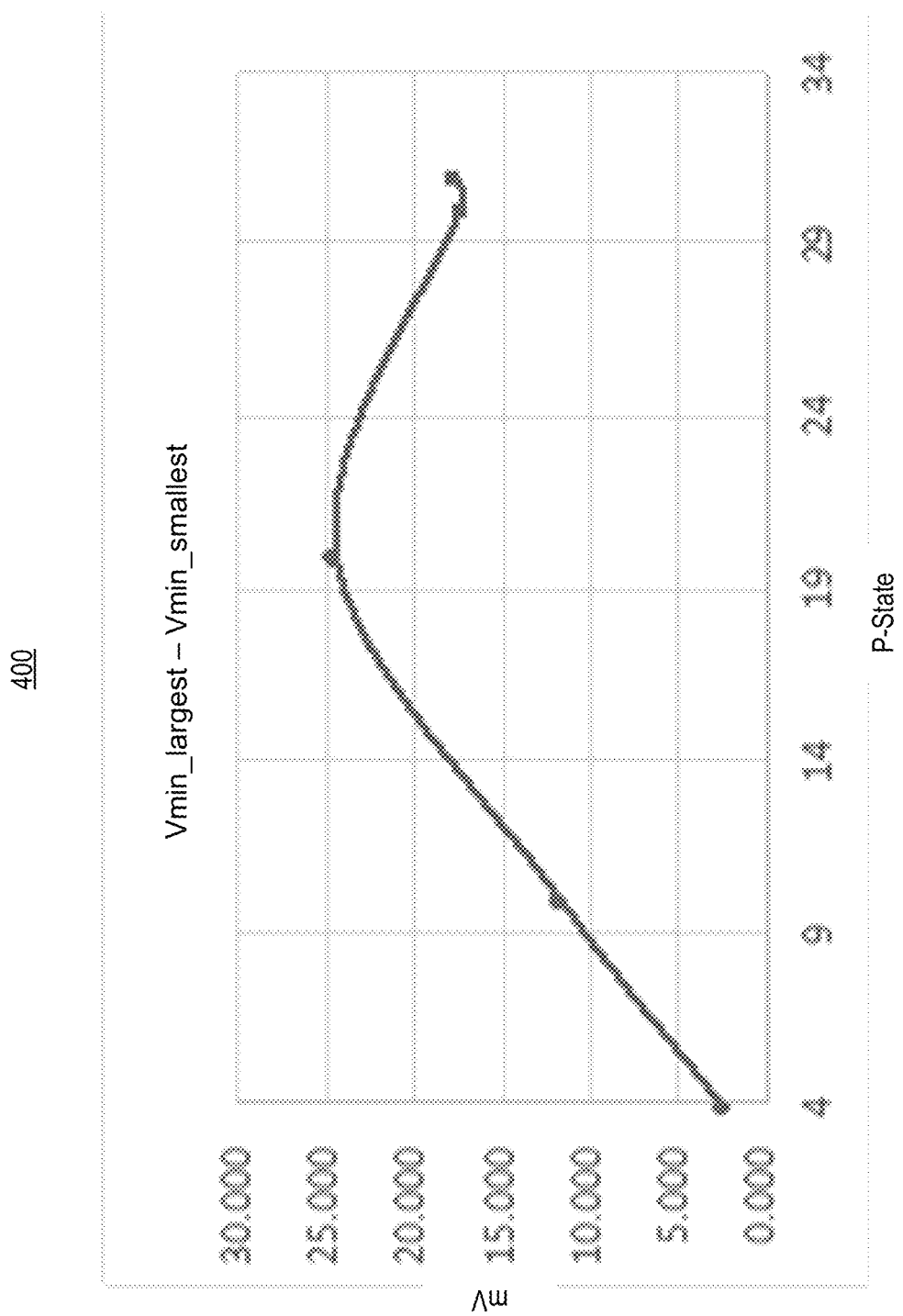
FIG. 4 illustrates a plot showing $V_{min}$ differentials are tangible after ITD application.

FIG. 4 illustrates plot 400 showing $V_{min}$ differentials are tangible after Inverse Thermal Dependence (ITD) application. An additional buffered value (guardband) can be applied to the $V_{min}$ due to various reasons such as Low Temperature Effect compensation (LTEC) at run-time and in long-term as Reliability Stress Requirement (RSR). The ITD accounts for the relation between die temperature and expected $V_{cc}$ values. However, ITD applied $V_{min}$ does not intervene with the various embodiments here since the per-core (per-p-state) $V_{min}$ delta is still applicable after ITD considerations. Further, unlike $V_{min}$ variation for a given p-state, the ITD variation across cores is small (e.g., less than 2% coefficient of variance in the region of interest).

Figure 5:
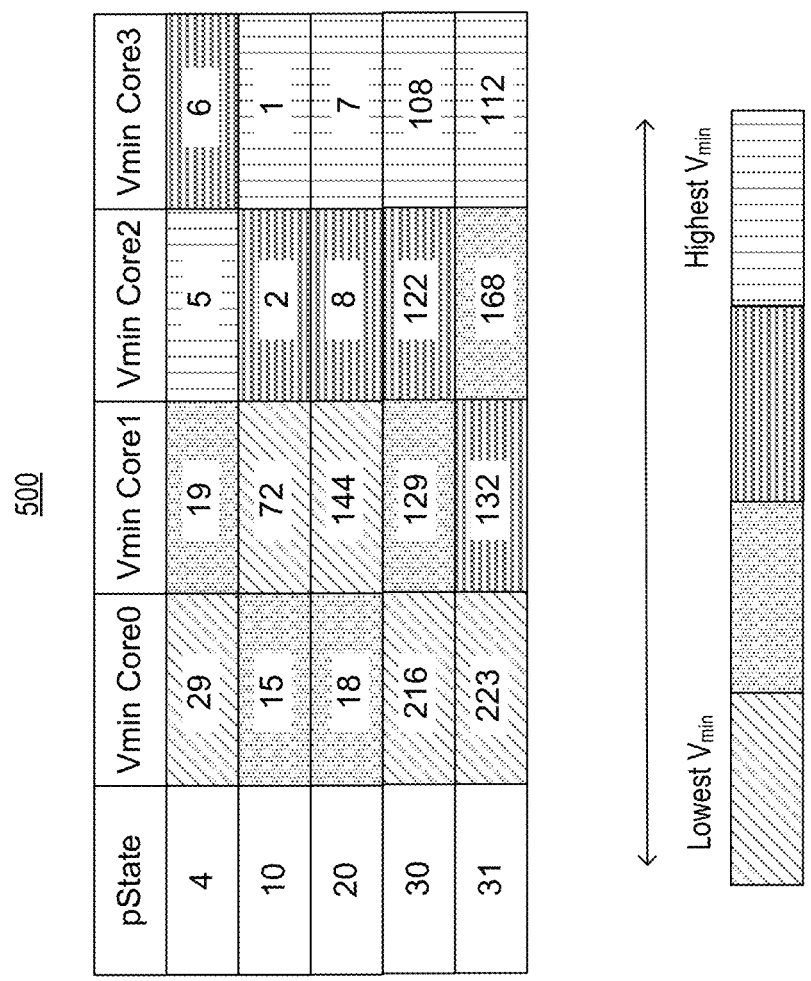
FIG. 5 illustrates a ranking scheme to translate the array of $V_{min}$ per core of FIG. 3 to ranking array per p-state, in accordance with some embodiments.

FIG. 5 illustrates a ranking scheme 500 to translate the array of $V_{min}$ per core of FIG. 3 to ranking array per p-state, in accordance with some embodiments. In some embodiments, an additional routine is added during HVM process that compares the different $V_{min}$ across relevant core and/or voltage domains of the processor and updates appropriate register(s) with this relative rank information. For example, assigning a sequential set of ranks for a homogenous set of cores that are under independent voltage domains. Further multiple or hierarchy independent ranking can be created depending on processor topology. (e.g., different set of ranks for processor cores in a multiprocessor versus Atom processors etc.).

For software scheduling to take advantage of an energy efficient (EE) core, the software scheduler needs to know which core to pick from the relative EE ranking among cores at a given p-state. In one example, Intel Architecture ISA extension programming can be used for software scheduling. One such abstraction is described in the hardware (HW) feedback structure of Table 2.

mirrored in the per-core per p-state ranking-table. The ranking function is intended to be platform specific. This is owing to per-platform attributes such as relative instructions per cycle (IPC) gains of different processor cores etc. The ranking can be determine using a function. One such generation ranking function arguments are expressed below.

$$F(V_{min\_Largest}, V_{min\_smallest}, V_{min\_thisCore}, p\text{-state}, relative\text{-}IPC)$$

Where p-state, relative-IPC are Hardware Guided Scheduling (HGS) arguments while $V_{min\_Largest}$, $V_{min\_smallest}$, $V_{min\_thisCore}$ are additional arguments added to determine per core ranking. The higher the number, the higher the ranking which implies better EE core. The arguments here refer to dependence-on relative IPC and p-state in the existing/initial version of HGS.

Figure 6:
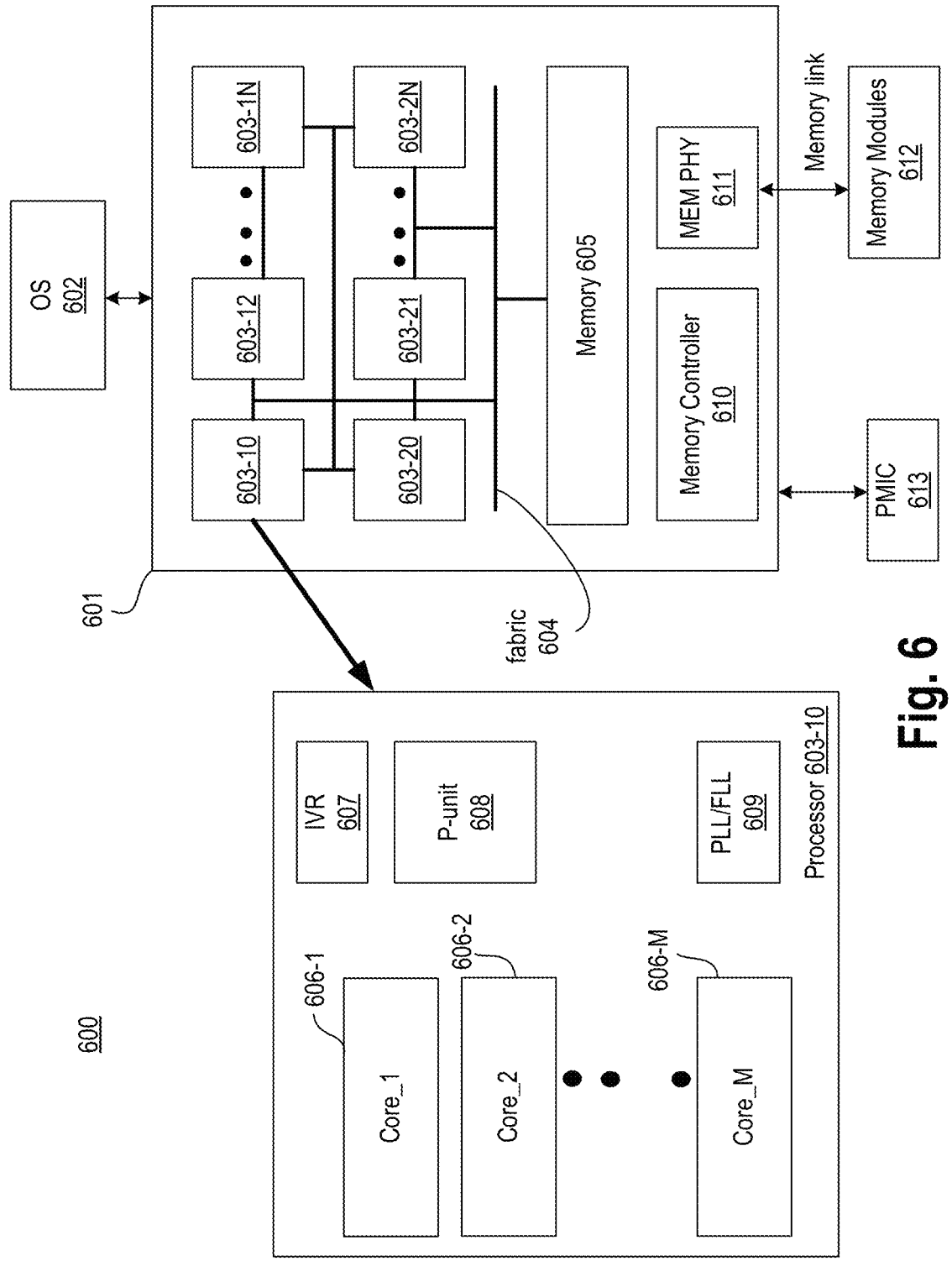
FIG. 6 illustrates a processor system with apparatus or mechanism for energy-efficient core voltage selection, in accordance with some embodiments.

FIG. 6 illustrates a processor system 600 with apparatus or mechanism for energy-efficient core voltage selection, in accordance with some embodiments. Processor system 600 comprises processor 601 coupled to operating system (OS) 602. Processor 601 comprises one or more processors 603 (individually labeled as processors 603_10 through 603_1N, and 603_20 through 603_2N, where 'N' is a number), fabric 604 connecting the processor 603, memory 605, memory controller 610, and memory physical layer (MEM PHY) 611. In some embodiments, each processor 603 is a die, dielet, or chiplet. Here the term "die" generally refers to a single continuous piece of semiconductor material (e.g. silicon) where transistors or other components making up a processor core may reside. Multi-core processors may have two or more processors on a single die, but alternatively, the two or more processors may be provided on two or more respective dies. Each die has a dedicated power controller or power control unit (p-unit) power controller or power control unit (p-unit) which can be dynamically or statically configured as a supervisor or supervisee. In some examples,

TABLE 2

| Byte Offset | Size (Bytes) | Field Name | Description |
|---|---|---|---|
| 0 | 1 | Performance capability | Performance capability is an 8-bit value (0 . . . 255) specifying the relative performance level of a logical processor. Higher values indicate higher performance; lowest performance level of 0 indicates a recommendation t0 the OS to not schedule any software threads on it for performance reasons initialized by OS to 0 |
| 1 | 1 | Energy Efficiency (EE) capability | Energy efficiency capability is an 8-bit value (0 . . . 255) specifying the relative energy efficiency level of a logical processor. Higher values indicate higher energy efficiency. The lowest energy efficiency capability of 0 indicates a recommendation to the OS to not schedule any software threads on it for efficiency reasons. Initialized by OS to 0. |

The energy efficiency capability field can be used to ascertain per core $V_{min}$. Specifically, there is a per-core structure initialized with performance capability as well as EE-capability. The performance capability is an indicator of performant core rankings (near turbo), while the EE-capability is listed for a fixed frequency closer to LFM. The EE-capability frequency is a direct function of an efficient frequency for low-power scenarios, also known as $P_e$. To retain the compatibility with the existing definition in public programming reference document, the HVM defined (fused or stored in NVM) ranking scheme can be read and translated into existing HW feedback registers, in accordance with some embodiments.

FIG. 5 summarize the ranking scheme, wherein the pattern codes of FIG. 3 in the per-core, per p-state $V_{min}$ table are dies are of the same size and functionality i.e., symmetric cores. However, dies can also be asymmetric. For example, some dies have different size and/or function than other dies. Each processor 603 may also be a dielet or chiplet. Here the term "dielet" or "chiplet" generally refers to a physically distinct semiconductor die, typically connected to an adjacent die in a way that allows the fabric across a die boundary to function like a single fabric rather than as two distinct fabrics. Thus at least some dies may be dielets. Each dielet may include one or more p-units which can be dynamically or statically configured as a supervisor, supervisee or both.

In some embodiments, fabric 604 is a collection of interconnects or a single interconnect that allows the various dies to communicate with one another. Here the term "fabric" generally refers to communication mechanism having a known set of sources, destinations, routing rules, topology and other properties. The sources and destinations may be any type of data handling functional unit such as power management units. Fabrics can be two-dimensional spanning along an x-y plane of a die and/or three-dimensional (3D) spanning along an x-y-z plane of a stack of vertical and horizontally positioned dies. A single fabric may span multiple dies. A fabric can take any topology such as mesh topology, star topology, daisy chain topology. A fabric may be part of a network-on-chip (NoC) with multiple agents. These agents can be any functional unit.

In some embodiments, each processor 603 may include a number of processor cores. One such example is illustrated with reference to processor 603_10. In this example, processor 603_10 includes a plurality of processor cores 606-1 through 606-M, where M is a number. For the sake of simplicity, a processor core is referred by the general label 606. Here, the term "processor core" generally refers to an independent execution unit that can run one program thread at a time in parallel with other cores. A processor core may include a dedicated power controller or power control unit (p-unit) which can be dynamically or statically configured as a supervisor or supervisee. This dedicated p-unit is also referred to as an autonomous p-unit, in some examples. In some examples, all processor cores are of the same size and functionality i.e., symmetric cores. However, processor cores can also be asymmetric.

For example, some processor cores have different size and/or function than other processor cores. A processor core can be a virtual processor core or a physical processor core. Processor 603_10 may include an integrated voltage regulator (IVR) 607, power control unit (p-unit) 608, phase locked loop (PLL) and/or frequency locked loop (FLL) 609. The various blocks of processor 603_10 may be coupled via an interface or fabric. Here, the term "interconnect" refers to a communication link, or channel, between two or more points or nodes. It may comprise one or more separate conduction paths such as wires, vias, waveguides, passive components, and/or active components. It may also comprise a fabric. In some embodiments, p-unit 608 is coupled to OS 602 via an interface. Here the term "interface" generally refers to software and/or hardware used to communicate with an interconnect. An interface may include logic and I/O driver/receiver to send and receive data over the interconnect or one or more wires.

In some embodiments, each processor 603 is coupled to a power supply via voltage regulator. The voltage regulator may be internal to processor system 601 (e.g., on the package of processor system 601) or external to processor system 601. In some embodiments, each processor 603 includes IVR 607 that receives a primary regulated voltage from the voltage regulator of processor system 601 and generates an operating voltage for the agents of processor 603. The agents of processor 603 are the various components of processor 603 including cores 606, IVR 607, p-unit 608, PLL/FLL 609, etc.

Accordingly, an implementation of IVR 607 may allow for fine-grained control of voltage and thus power and performance of each individual core 606. As such, each core 606 can operate at an independent voltage and frequency, enabling great flexibility and affording wide opportunities for balancing power consumption with performance. In some embodiments, the use of multiple IVRs enables the grouping of components into separate power planes, such that power is regulated and supplied by the IVR to only those components in the group. For example, each core 606 may include an IVR to manage power supply to that core where that IVR receives input power supply from the regulated output of IVR 607 or voltage regulator of processor system 601. During power management, a given power domain of one IVR may be powered down or off when the processor core 606 is placed into a certain low power state, while another power domain of another IVR remains active, or fully powered. As such, an IVR may control a certain domain of a logic or processor core 606. Here the term "domain" generally refers to a logical or physical perimeter that has similar properties (e.g., supply voltage, operating frequency, type of circuits or logic, and/or workload type) and/or is controlled by a particular agent. For example, a domain may be a group of logic units or function units that are controlled by a particular supervisor. A domain may also be referred to an Autonomous Perimeter (AP). A domain can be an entire system-on-chip (SoC) or part of the SoC, and is governed by a p-unit.

In some embodiments, each processor 603 includes its own p-unit 608. P-unit 608 controls the power and/or performance of processor 603. P-unit 608 may control power and/or performance (e.g., IPC, frequency) of each individual core 606. In various embodiments, p-unit 608 of each processor 603 is coupled via fabric 604. As such, the p-units 608 of each processor 603 communicate with another and OS 602 to determine the optimal power state of processor system 601 by controlling power states of individual cores 606 under their domain.

P-unit 608 may include circuitry including hardware, software and/or firmware to perform power management operations with regard to processor 603. In some embodiments, p-unit 608 provides control information to voltage regulator of processor system 601 via an interface to cause the voltage regulator to generate the appropriate regulated voltage. In some embodiments, p-unit 608 provides control information to IVRs of cores 606 via another interface to control the operating voltage generated (or to cause a corresponding IVR to be disabled in a low power mode). In some embodiments, p-unit 608 may include a variety of power management logic units to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software). In some embodiments, p-unit 608 is implemented as a microcontroller.

The microcontroller can be an embedded microcontroller which is a dedicated controller or as a general-purpose controller. In some embodiments, p-unit 608 is implemented as a control logic configured to execute its own dedicated power management code, here referred to as pCode. In some embodiments, power management operations to be performed by p-unit 608 may be implemented externally to a processor 603, such as by way of a separate power management integrated circuit (PMIC) 613 or other component external to processor system 601. In yet other embodiments, power management operations to be performed by p-unit 608 may be implemented within BIOS or other system software. In some embodiments, p-unit 608 of a processor 603 may assume a role of a supervisor or supervisee.

Here the term "supervisor" generally refers to a power controller, or power management, unit (a "p-unit"), which monitors and manages power and performance related parameters for one or more associated power domains, either alone or in cooperation with one or more other p-units.

Power/performance related parameters may include but are not limited to domain power, platform power, voltage, voltage domain current, die current, load-line, temperature, device latency, utilization, clock frequency, processing efficiency, current/future workload information, and other parameters. It may determine new power or performance parameters (limits, average operational, etc.) for the one or more domains. These parameters may then be communicated to supervisee p-units, or directly to controlled or monitored entities such as VR or clock throttle control registers, via one or more fabrics and/or interconnects. A supervisor learns of the workload (present and future) of one or more dies, power measurements of the one or more dies, and other parameters (e.g., platform level power boundaries) and determines new power limits for the one or more dies. These power limits are then communicated by supervisor p-units to the supervisee p-units via one or more fabrics and/or interconnect. In examples where a die has one p-unit, a supervisor (Svor) p-unit is also referred to as supervisor die.

Here the term "supervisee" generally refers to a power controller, or power management, unit (a "p-unit"), which monitors and manages power and performance related parameters for one or more associated power domains, either alone or in cooperation with one or more other p-units and receives instructions from a supervisor to set power and/or performance parameters (e.g., supply voltage, operating frequency, maximum current, throttling threshold, etc.) for its associated power domain. In examples where a die has one p-unit, a supervisee (Svee) p-unit may also be referred to as a supervisee die. Note that a p-unit may serve either as a Svor, a Svee, or both a Svor/Svee p-unit In various embodiments, p-unit 608 executes a firmware (referred to as pCode) that communicates with OS 602. In various embodiments, each processor 603 includes a PLL or FLL 609 that generates clock from p-unit 608 and input clock (or reference clock) for each core 606. Cores 606 may include or be associated with independent clock generation circuitry such as one or more PLLs to control operating frequency of each core 606 independently. In some embodiments, memory controller (MC) 610 manages read and/or write operations with one or more memory modules 612. The memory modules 612 are coupled to processor 601 via memory physical layer (MEM PHY) 611.

In some embodiments, processor system 601 comprises fuses or NVM that store Vmin per processor core 606 from among the plurality of processor cores. In various embodiments, p-unit 608 executes a firmware (pCode) to rank each processor core 606 according to the Vmin per processor core; and to assign a bootstrap processor to a processor core having a highest ranking. In some embodiments, OS 602 schedules interrupts or services low utilization tasks on the processor core having the highest ranking. In some embodiments, the firmware assigns ranked processor cores Advanced Processor Interrupt Controller (APIC) identifications (IDs). In some embodiments, the firmware shares the ranked APIC IDs of the processor cores to OS 602. In some embodiments, the firmware shares the ranked APIC IDs via an Advanced Configuration and Power Interface (ACPI) table. ACPI is an industry specification for the efficient handling of power consumption in desktop and mobile computers. ACPI specifies how a computer's basic input/output system, operating system, and peripheral devices communicate with each other about power usage. In some embodiments, the ACPI table comprises a Multiple APIC Description Table (MADT). The MADT describes all of the interrupt controllers in the system. It can be used to enumerate the processors or cores currently available. In some embodiments, the firmware ranks rank each processor core 606 based on efficiency of the processor core around low frequency mode frequencies.

Figure 7:
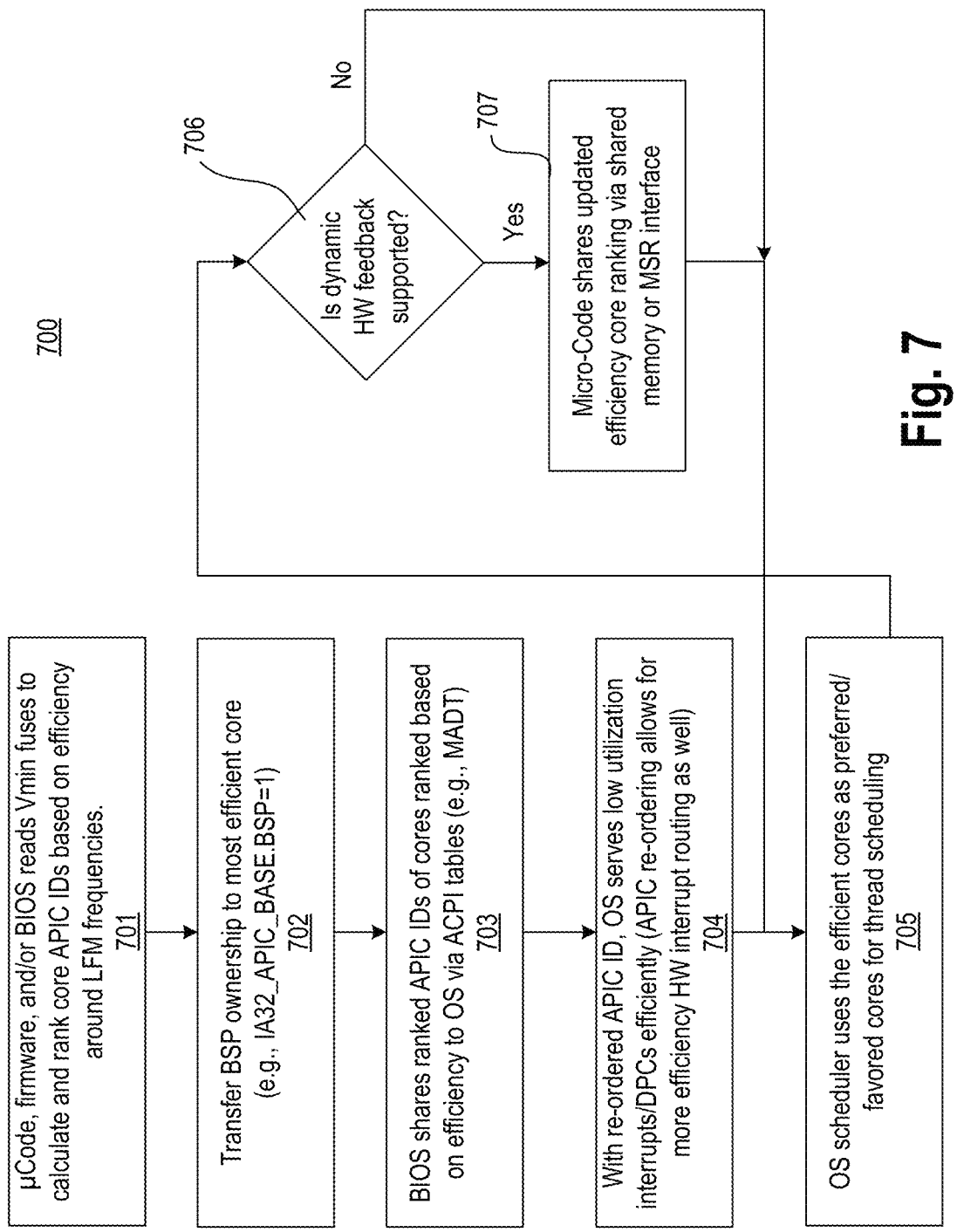
FIG. 7 illustrates a flowchart of energy efficient Boot-Strap processor (BSP) selection, interrupt routing and/or serving and low utilization thread scheduling based on $V_{min}$, in accordance with some embodiments.

FIG. 7 illustrates flowchart 700 of energy efficient interrupt routing and/or serving and low utilization thread scheduling based on Vmin, in accordance with some embodiments. The ranking can be initialized by μCode (microcode) firmware. One example of a μCode firmware is pCode executed by a power management unit (PMU or p-unit). Additionally, by supporting interrupt mechanism, as defined in the hardware (HW) feedback infrastructure, a run-time update is feasible. Such a mechanism is useful when some cores are offline'd or other long-time events such as reliability stress restrictor (RSR) based VF core switch to new but predefined VF curve. Some computer platforms are equipped to move over to different VF curve as pre-programmed when they wear-out over several years of usage and the old VF curve is not suitable anymore.

While various blocks herein are shown in a particular order, the order can be modified. For example, some blocks or operations can be performed before others while some blocks or operations are performed in parallel. The blocks can be performed by hardware, software, or a combination of hardware and software. In various embodiments, the bootstrap flow is modified to identify the bootstrap processor core (BSP). The BSP handles initialization procedures for the system as a whole. These procedures include identifying properties of the system logic, checking the integrity of memory, starting the remaining processors, and loading the operating system into memory. The BSP is marked as the most energy efficiency core of the SoC and is assigned the lowest APIC (advanced processor interrupt controller) ID (identification) value. The APIC ID value specifies a target processor to receive interrupt delivered in logical destination mode in a local x2APIC. This is a 32-bit value initialized by hardware. While the APIC ID is an Intel Architecture term, a similar function in other processor architectures can also be used to identify a bootstrap processor.

Initially, BSP is core0 or any core of a multi-core system. In a heterogenous set of cores comprising big cores (or complex and/or high-power applications) and little cores (for less complex and/or low power applications), the BSP can be one of the little cores. This initial BSP is used to identify the energy efficient (EE) BSP. However, in some embodiments, a big core can also be used as an DSP.

In that context, at block 701, the microcode (e.g., pCode) or BIOS (built-in input output system) reads the fuses or NVM that store the per-core $V_{min}$ values. These fuses are programmed during HVM. Upon reading the fuses or NVM, the microcode or BIOS calculates and ranks the cores as discussed with reference to FIG. 5. As such, microcode or BIOS calculates and ranks core APIC IDs based on efficiency around LFM frequencies. Based on the calculated and ranked cores, at block 702, the microcode or BIOS transfers BSP ownership to the most efficiency core (e.g., with higher ranking number) by setting a register (e.g., IA32_APIC_BASE.BSP=1).

In some embodiments, at block 703, the microcode or BIOS then shares the APIC IDs of the cores ranked based on efficiency to the operation system (or kernel). For example, the microcode or BIOS shares the APIC IDs of the cores ranked based on efficiency to the OS via ACPI (Advanced Configuration and Power Interface) tables such as the MADT (multiple interrupt controller table).

With the reordered APIC IDs, at block 704 the OS services low utilization tasks, interrupts, DPCs, efficiently on the core with the lowest $V_{min}$. Note, APIC ID re-ordering also allows for more efficiency HW interrupt routing. In some embodiments, at block 705, an OS scheduler uses the efficient cores as preferred or favored cores for thread scheduling and/or for other background apps or for servicing interrupts.

At block 706, a determination is made regarding support for dynamic hardware (HW). If the SoC supports dynamic HW feedback, then the process proceeds to block 707 where pCode (or any suitable microcode or firmware) shares the updated efficiency core ranking via shared memory or model-specific register (MSR) interface. If the SoC does not support dynamic HW feedback, the process proceeds to block 705. As discussed herein, at block 705 the OS scheduler uses the efficient cores as preferred or favored cores for thread scheduling and/or for other background apps or for servicing interrupts.

Elements of embodiments (e.g., flowcharts with reference various embodiments) are also provided as a machine-readable medium (e.g., memory) for storing the computer-executable instructions (e.g., instructions to implement any other processes discussed herein). In some embodiments, computing platform comprises memory, processor, machine-readable storage media (also referred to as tangible machine-readable medium), communication interface (e.g., wireless or wired interface), and network bus coupled together.

In some embodiments, processor is a Digital Signal Processor (DSP), an Application Specific Integrated Circuit (ASIC), a general-purpose Central Processing Unit (CPU), or a low power logic implementing a simple finite state machine to perform the method with reference to various flowcharts and/or various embodiments, etc.

In some embodiments, the various logic blocks of system are coupled together via a network bus. Any suitable protocol may be used to implement the network bus. In some embodiments, machine-readable storage medium includes Instructions (also referred to as the program software code/instructions) for calculating or measuring distance and relative orientation of a device with reference to another device as described with reference to various embodiments and flowchart.

Program software code/instructions associated with flowcharts with reference to various flowcharts and/or various embodiments and executed to implement embodiments of the disclosed subject matter may be implemented as part of an operating system or a specific application, component, program, object, module, routine, or other sequence of instructions or organization of sequences of instructions referred to as "program software code/instructions," "operating system program software code/instructions," "application program software code/instructions," or simply "software" or firmware embedded in processor. In some embodiments, the program software code/instructions associated with flowcharts with reference to various flowcharts and/or various embodiments are executed by system.

In some embodiments, the program software code/instructions associated with reference to various flowcharts and/or various embodiments are stored in a computer executable storage medium and executed by the processor. Here, computer executable storage medium is a tangible machine-readable medium that can be used to store program software code/instructions and data that, when executed by a computing device, causes one or more processors to perform a method(s) as may be recited in one or more accompanying claims directed to the disclosed subject matter.

The tangible machine-readable medium may include storage of the executable software program code/instructions and data in various tangible locations, including for example ROM, volatile RAM, non-volatile memory and/or cache and/or other tangible memory as referenced in the present application. Portions of this program software code/instructions and/or data may be stored in any one of these storage and memory devices. Further, the program software code/instructions can be obtained from other storage, including, e.g., through centralized servers or peer to peer networks and the like, including the Internet. Different portions of the software program code/instructions and data can be obtained at different times and in different communication sessions or in the same communication session.

The software program code/instructions (associated with reference to various flowcharts and/or various embodiments) and data can be obtained in their entirety prior to the execution of a respective software program or application by the computing device. Alternatively, portions of the software program code/instructions and data can be obtained dynamically, e.g., just in time, when needed for execution. Alternatively, some combination of these ways of obtaining the software program code/instructions and data may occur, e.g., for different applications, components, programs, objects, modules, routines or other sequences of instructions or organization of sequences of instructions, by way of example. Thus, it is not required that the data and instructions be on a tangible machine readable medium in entirety at a particular instance of time.

Examples of tangible computer-readable media include but are not limited to recordable and non-recordable type media such as volatile and non-volatile memory devices, read only memory (ROM), random access memory (RAM), flash memory devices, floppy and other removable disks, magnetic storage media, optical storage media (e.g., Compact Disk Read-Only Memory (CD ROMS), Digital Versatile Disks (DVDs), etc.), among others. The software program code/instructions may be temporarily stored in digital tangible communication links while implementing electrical, optical, acoustical or other forms of propagating signals, such as carrier waves, infrared signals, digital signals, etc. through such tangible communication links.

In general, tangible machine readable medium includes any tangible mechanism that provides (i.e., stores and/or transmits in digital form, e.g., data packets) information in a form accessible by a machine (i.e., a computing device), which may be included, e.g., in a communication device, a computing device, a network device, a personal digital assistant, a manufacturing tool, a mobile communication device, whether or not able to download and run applications and subsidized applications from the communication network, such as the Internet, e.g., an iPhone®, Galaxy®, or the like, or any other device including a computing device. In one embodiment, processor-based system is in a form of or included within a PDA (personal digital assistant), a cellular phone, a notebook computer, a tablet, a game console, a set top box, an embedded system, a TV (television), a personal desktop computer, etc. Alternatively, the traditional communication applications and subsidized application(s) may be used in some embodiments of the disclosed subject matter.

In some embodiments a machine-readable storage media is provided machine-readable instructions that when executed cause one or more processors to perform a method comprising reading fuses or NVM that store Vmin per processor core in a multi-core system. The method further comprises ranking, from a highest ranking to a lowest ranking, each processor core of the multi-core system according to the Vmin per processor core; and modifying an existing bootstrap processor by assigning a new bootstrap processor to a processor core having the highest ranking. In some embodiments, an operating system schedules interrupts or services low utilization tasks on the processor core having the highest ranking. In some embodiments, the ranked processor cores have ranked APIC IDs.

In some embodiments, the method comprises sharing ranked APIC IDs of the processor codes to an operating system. The sharing of ranked APIC IDs is via an ACPI table. In some embodiments, the ACPI table comprises a MADT. In some embodiments, ranking each processor core of the multi-core system is further based on efficiency of the processor core around low frequency mode frequencies. In some embodiments, the fuses or NVM are programmed during high-volume manufacturing with Vmin per processor core.

Figure 8:
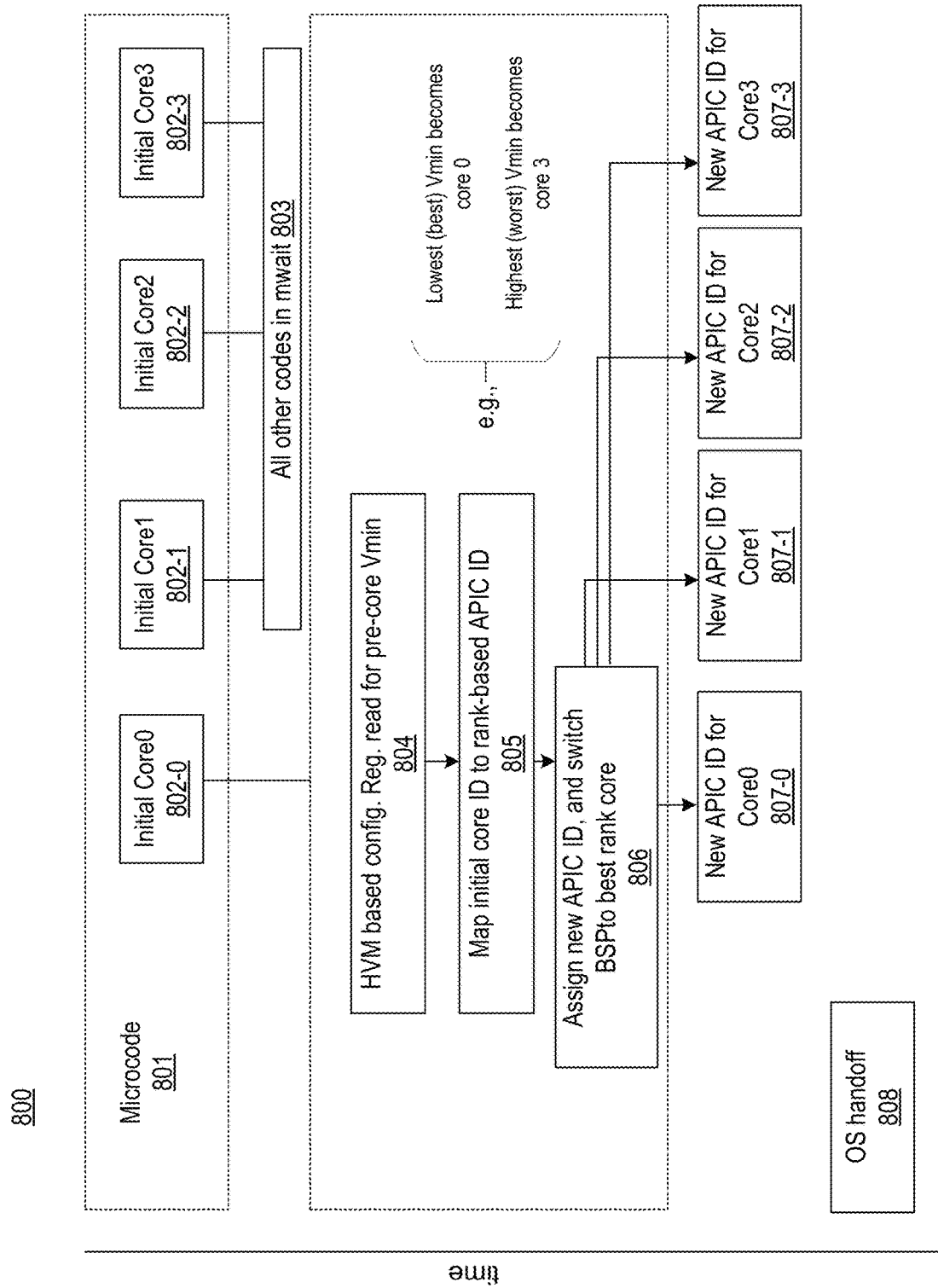
FIG. 8 illustrates a boot flow below an operating system (OS) handoff for efficient interrupt routing/servicing and OS specific core parking benefits, in accordance with some embodiments.

FIG. 8 illustrates boot flow 800 before an OS handoff for efficient interrupt routing and/or servicing and OS specific core parking benefits, in accordance with some embodiments. Here, boot flow 800 is shown operating from top to bottom in time. At block 801, microcode or firmware (such as pCode) logically assigns the first core 802-0 (i.e., core 0) as the BSP. All other cores 802-1, 802-2, and 802-3 want for BSP core0 802-0 to compare before they can perform. As such, cores 802-1, 802-2, and 802-3 are in MWAIT as indicated by 803. MWAIT instruction provides hints to allow the processor (or core) to enter an implementation-dependent optimized state. In this example, a four-core system is shown. However, the embodiments are applicable to any number of and types of cores. Here types of cores may include cores of different functions, sizes, etc.

In some embodiments, the bootstrap flow identifies the BSP as the most energy efficiency core of the SoC and assigns the that core the lowest APIC ID value. The APIC ID value that specifies a target processor to receive interrupt delivered in logical destination mode in a local x2APIC.

One possible implementation using the underlying novelty exists in case of OSs that support core-parking. For example, on Window® platform the default mechanism to do core-parking follows natural enumeration order. Core Parking is a feature, that dynamically selects a set of processors that should stay idle and not run any threads based on the current power policy and their recent utilization. This decreases energy consumption and therefore reduces the heat and power usage.

To illustrate, on a 4-core system, the parking order is 4, 3, 2. However, by associating $V_{min}$ rank order to core-id enumeration order and transferring BSP ownership to most efficient core before OS handoff, the parking logic can naturally use ordered sequence (i.e. park the most inefficient core first, which is core 802-0 in this example). In addition, re-ordering the cores allows more efficient interrupt routing by HW and interrupt/DPC servicing by the OS. In this case, the core-id enumeration is done based on the relative efficiency of individual cores. Note that the extent of benefits of different implementations are native to the implementation. Independent of solution implementation, the core principle hinges on HVM manufacturing process enumerating the relative $V_{min}$ core order. An implementation specific sequence as illustrated through 804, 805, 806 and 807 can achieve the intended ranking which can actually be enforced during enumeration and boot flows. Therein, at block 808, the OS handoff is complete.

Figure 9:
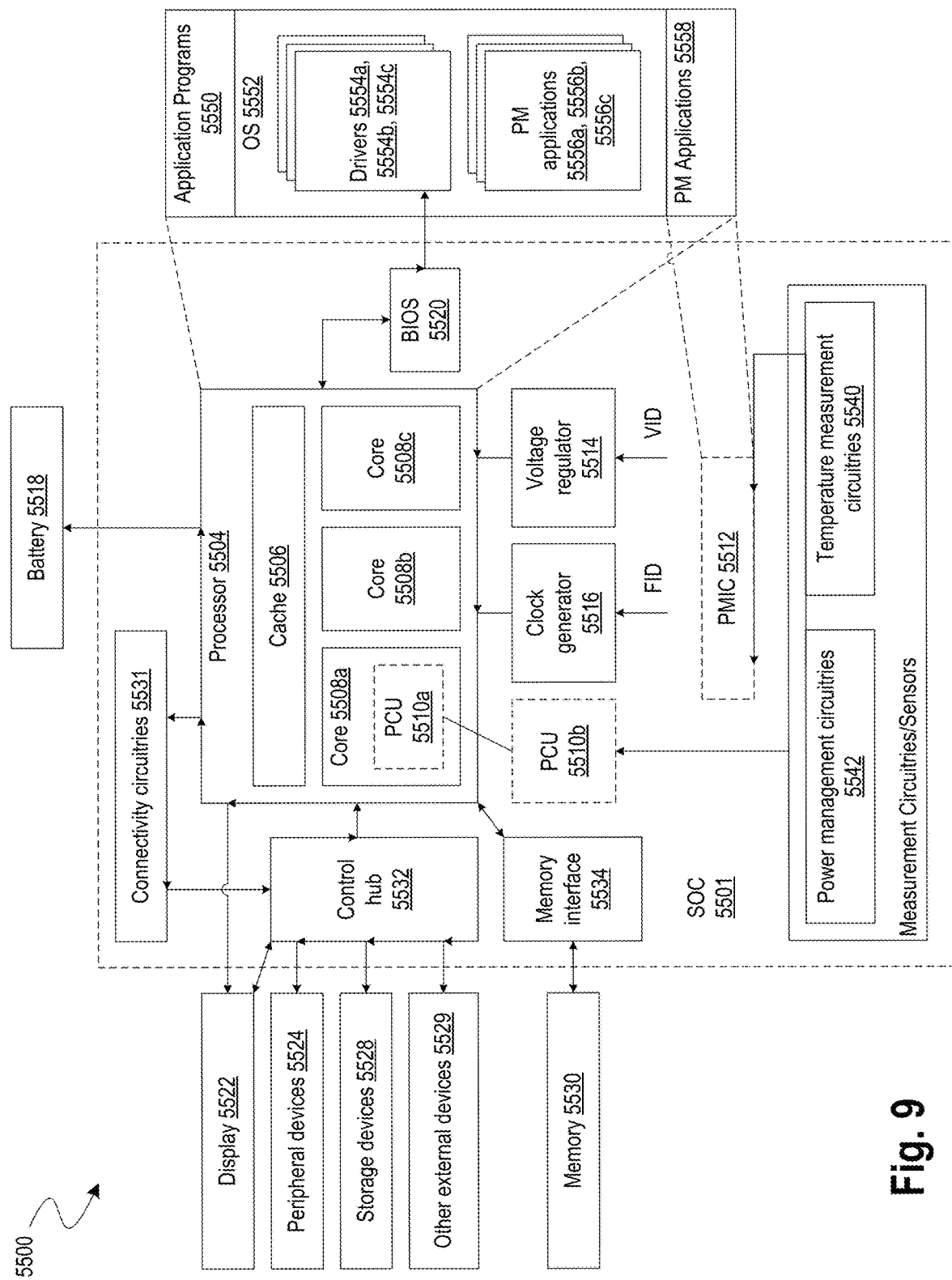
FIG. 9 illustrates a smart device or a computer system or a SoC (System-on-Chip) with firmware for energy efficient interrupt routing/serving and low utilization thread scheduling based on $V_{min}$, in accordance with some embodiments.

FIG. 9 illustrates a smart device or a computer system or a SoC (System-on-Chip) with firmware for energy efficient interrupt routing/serving and low utilization thread scheduling based on $V_{min}$, in accordance with some embodiments.

Any of the blocks herein can have the logic to gate or un-gate a clock according to security keys. In some embodiments, the SoC includes the crypto engine to generate the keys for other IP blocks within a platform. It is pointed out that those elements of FIG. 9 having the same reference numbers (or names) as the elements of any other figure may operate or function in any manner similar to that described, but are not limited to such.

In some embodiments, device 5500 represents an appropriate computing device, such as a computing tablet, a mobile phone or smart-phone, a laptop, a desktop, an Internet-of-Things (IOT) device, a server, a wearable device, a set-top box, a wireless-enabled e-reader, or the like. It will be understood that certain components are shown generally, and not all components of such a device are shown in device 5500.

In an example, the device 5500 comprises an SoC (System-on-Chip) 5501. An example boundary of the SoC 5501 is illustrated using dotted lines in FIG. 9, with some example components being illustrated to be included within SoC 5501—however, SoC 5501 may include any appropriate components of device 5500.

In some embodiments, device 5500 includes processor 5504. Processor 5504 can include one or more physical devices, such as microprocessors, application processors, microcontrollers, programmable logic devices, processing cores, or other processing implementations such as disaggregated combinations of multiple compute, graphics, accelerator, I/O and/or other processing chips. The processing operations performed by processor 5504 include the execution of an operating platform or operating system on which applications and/or device functions are executed. The processing operations include operations related to I/O (input/output) with a human user or with other devices, operations related to power management, operations related to connecting computing device 5500 to another device, and/or the like. The processing operations may also include operations related to audio I/O and/or display I/O.

In some embodiments, processor 5504 includes multiple processing cores (also referred to as cores) 5508a, 5508b, 5508c. Although merely three cores 5508a, 5508b, 5508c are illustrated in FIG. 9, processor 5504 may include any other appropriate number of processing cores, e.g., tens, or even hundreds of processing cores. Processor cores 5508a, 5508b, 5508c may be implemented on a single integrated circuit (IC) chip. Moreover, the chip may include one or more shared and/or private caches, buses or interconnections, graphics and/or memory controllers, or other components.

In some embodiments, processor 5504 includes cache 5506. In an example, sections of cache 5506 may be dedicated to individual cores 5508 (e.g., a first section of cache 5506 dedicated to core 5508a, a second section of cache 5506 dedicated to core 5508b, and so on). In an example, one or more sections of cache 5506 may be shared among two or more of cores 5508. Cache 5506 may be split in different levels, e.g., level 1 (L1) cache, level 2 (L2) cache, level 3 (L3) cache, etc.

In some embodiments, processor core 5504 may include a fetch unit to fetch instructions (including instructions with conditional branches) for execution by the core 5504. The instructions may be fetched from any storage devices such as the memory 5530. Processor core 5504 may also include a decode unit to decode the fetched instruction. For example, the decode unit may decode the fetched instruction into a plurality of micro-operations. Processor core 5504 may include a schedule unit to perform various operations associated with storing decoded instructions. For example, the schedule unit may hold data from the decode unit until the instructions are ready for dispatch, e.g., until all source values of a decoded instruction become available. In one embodiment, the schedule unit may schedule and/or issue (or dispatch) decoded instructions to an execution unit for execution.

The execution unit may execute the dispatched instructions after they are decoded (e.g., by the decode unit) and dispatched (e.g., by the schedule unit). In an embodiment, the execution unit may include more than one execution unit (such as an imaging computational unit, a graphics computational unit, a general-purpose computational unit, etc.). The execution unit may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit.

Further, execution unit may execute instructions out-of-order. Hence, processor core 5504 may be an out-of-order processor core in one embodiment. Processor core 5504 may also include a retirement unit. The retirement unit may retire executed instructions after they are committed. In an embodiment, retirement of the executed instructions may result in processor state being committed from the execution of the instructions, physical registers used by the instructions being de-allocated, etc. Processor core 5504 may also include a bus unit to enable communication between components of processor core 5504 and other components via one or more buses. Processor core 5504 may also include one or more registers to store data accessed by various components of the core 5504 (such as values related to assigned app priorities and/or sub-system states (modes) association.

In some embodiments, device 5500 comprises connectivity circuitries 5531. For example, connectivity circuitries 5531 includes hardware devices (e.g., wireless and/or wired connectors and communication hardware) and/or software components (e.g., drivers, protocol stacks), e.g., to enable device 5500 to communicate with external devices. Device 5500 may be separate from the external devices, such as other computing devices, wireless access points or base stations, etc.

In an example, connectivity circuitries 5531 may include multiple different types of connectivity. To generalize, the connectivity circuitries 5531 may include cellular connectivity circuitries, wireless connectivity circuitries, etc. Cellular connectivity circuitries of connectivity circuitries 5531 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, 3rd Generation Partnership Project (3GPP) Universal Mobile Telecommunications Systems (UMTS) system or variations or derivatives, 3GPP Long-Term Evolution (LTE) system or variations or derivatives, 3GPP LTE-Advanced (LTE-A) system or variations or derivatives, Fifth Generation (5G) wireless system or variations or derivatives, 5G mobile networks system or variations or derivatives, 5G New Radio (NR) system or variations or derivatives, or other cellular service standards. Wireless connectivity circuitries (or wireless interface) of the connectivity circuitries 5531 refers to wireless connectivity that is not cellular, and can include personal area networks (such as Bluetooth, Near Field, etc.), local area networks (such as Wi-Fi), and/or wide area networks (such as WiMax), and/or other wireless communication. In an example, connectivity circuitries 5531 may include a network interface, such as a wired or wireless interface, e.g., so that a system embodiment may be incorporated into a wireless device, for example, a cell phone or personal digital assistant.

In some embodiments, device 5500 comprises control hub 5532, which represents hardware devices and/or software components related to interaction with one or more I/O devices. For example, processor 5504 may communicate with one or more of display 5522, one or more peripheral devices 5524, storage devices 5528, one or more other external devices 5529, etc., via control hub 5532. Control hub 5532 may be a chipset, a Platform Control Hub (PCH), and/or the like.

For example, control hub 5532 illustrates one or more connection points for additional devices that connect to device 5500, e.g., through which a user might interact with the system. For example, devices (e.g., devices 5529) that can be attached to device 5500 include microphone devices, speaker or stereo systems, audio devices, video systems or other display devices, keyboard or keypad devices, or other I/O devices for use with specific applications such as card readers or other devices.

As mentioned above, control hub 5532 can interact with audio devices, display 5522, etc. For example, input through a microphone or other audio device can provide input or commands for one or more applications or functions of device 5500. Additionally, audio output can be provided instead of, or in addition to display output. In another example, if display 5522 includes a touch screen, display 5522 also acts as an input device, which can be at least partially managed by control hub 5532. There can also be additional buttons or switches on computing device 5500 to provide I/O functions managed by control hub 5532. In one embodiment, control hub 5532 manages devices such as accelerometers, cameras, light sensors or other environmental sensors, or other hardware that can be included in device 5500. The input can be part of direct user interaction, as well as providing environmental input to the system to influence its operations (such as filtering for noise, adjusting displays for brightness detection, applying a flash for a camera, or other features).

In some embodiments, control hub 5532 may couple to various devices using any appropriate communication protocol, e.g., PCIe (Peripheral Component Interconnect Express), USB (Universal Serial Bus), Thunderbolt, High Definition Multimedia Interface (HDMI), Firewire, etc.

In some embodiments, display 5522 represents hardware (e.g., display devices) and software (e.g., drivers) components that provide a visual and/or tactile display for a user to interact with device 5500. Display 5522 may include a display interface, a display screen, and/or hardware device used to provide a display to a user. In some embodiments, display 5522 includes a touch screen (or touch pad) device that provides both output and input to a user. In an example, display 5522 may communicate directly with the processor 5504. Display 5522 can be one or more of an internal display device, as in a mobile electronic device or a laptop device or an external display device attached via a display interface (e.g., DisplayPort, etc.). In one embodiment display 5522 can be a head mounted display (HMD) such as a stereoscopic display device for use in virtual reality (VR) applications or augmented reality (AR) applications.

In some embodiments, and although not illustrated in the figure, in addition to (or instead of) processor 5504, device 5500 may include Graphics Processing Unit (GPU) comprising one or more graphics processing cores, which may control one or more aspects of displaying contents on display 5522.

Control hub 5532 (or platform controller hub) may include hardware interfaces and connectors, as well as software components (e.g., drivers, protocol stacks) to make peripheral connections, e.g., to peripheral devices 5524.

It will be understood that device 5500 could both be a peripheral device to other computing devices, as well as have peripheral devices connected to it. Device 5500 may have a "docking" connector to connect to other computing devices for purposes such as managing (e.g., downloading and/or uploading, changing, synchronizing) content on device 5500. Additionally, a docking connector can allow device 5500 to connect to certain peripherals that allow computing device 5500 to control content output, for example, to audiovisual or other systems.

In addition to a proprietary docking connector or other proprietary connection hardware, device 5500 can make peripheral connections via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, connectivity circuitries 5531 may be coupled to control hub 5532, e.g., in addition to, or instead of, being coupled directly to the processor 5504. In some embodiments, display 5522 may be coupled to control hub 5532, e.g., in addition to, or instead of, being coupled directly to processor 5504.

In some embodiments, device 5500 comprises memory 5530 coupled to processor 5504 via memory interface 5534. Memory 5530 includes memory devices for storing information in device 5500.

In some embodiments, memory 5530 includes apparatus to maintain stable clocking as described with reference to various embodiments. Memory can include nonvolatile (state does not change if power to the memory device is interrupted) and/or volatile (state is indeterminate if power to the memory device is interrupted) memory devices. Memory device 5530 can be a dynamic random-access memory (DRAM) device, a static random-access memory (SRAM) device, flash memory device, phase-change memory device, or some other memory device having suitable performance to serve as process memory. In one embodiment, memory 5530 can operate as system memory for device 5500, to store data and instructions for use when the one or more processors 5504 executes an application or process. Memory 5530 can store application data, user data, music, photos, documents, or other data, as well as system data (whether long-term or temporary) related to the execution of the applications and functions of device 5500.

Elements of various embodiments and examples are also provided as a machine-readable medium (e.g., memory 5530) for storing the computer-executable instructions (e.g., instructions to implement any other processes discussed herein). The machine-readable medium (e.g., memory 5530) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, device 5500 comprises temperature measurement circuitries 5540, e.g., for measuring temperature of various components of device 5500. In an example, temperature measurement circuitries 5540 may be embedded, or coupled or attached to various components, whose temperature are to be measured and monitored. For example, temperature measurement circuitries 5540 may measure temperature of (or within) one or more of cores 5508$a$, 5508$b$, 5508$c$, voltage regulator 5514, memory 5530, a mother-board of SoC 5501, and/or any appropriate component of device 5500. In some embodiments, temperature measurement circuitries 5540 include a low power hybrid reverse (LPHR) bandgap reference (BGR) and digital temperature sensor (DTS), which utilizes subthreshold metal oxide semiconductor (MOS) transistor and the PNP parasitic Bi-polar Junction Transistor (BJT) device to form a reverse BGR that serves as the base for configurable BGR or DTS operating modes. The LPHR architecture uses low-cost MOS transistors and the standard parasitic PNP device. Based on a reverse bandgap voltage, the LPHR can work as a configurable BGR. By comparing the configurable BGR with the scaled base-emitter voltage, the circuit can also perform as a DTS with a linear transfer function with single-temperature trim for high accuracy.

In some embodiments, device 5500 comprises power measurement circuitries 5542, e.g., for measuring power consumed by one or more components of the device 5500. In an example, in addition to, or instead of, measuring power, the power measurement circuitries 5542 may measure voltage and/or current. In an example, the power measurement circuitries 5542 may be embedded, or coupled or attached to various components, whose power, voltage, and/or current consumption are to be measured and monitored. For example, power measurement circuitries 5542 may measure power, current and/or voltage supplied by one or more voltage regulators 5514, power supplied to SoC 5501, power supplied to device 5500, power consumed by processor 5504 (or any other component) of device 5500, etc.

In some embodiments, device 5500 comprises one or more voltage regulator circuitries, generally referred to as voltage regulator (VR) 5514. VR 5514 generates signals at appropriate voltage levels, which may be supplied to operate any appropriate components of the device 5500. Merely as an example, VR 5514 is illustrated to be supplying signals to processor 5504 of device 5500. In some embodiments, VR 5514 receives one or more Voltage Identification (VID) signals, and generates the voltage signal at an appropriate level, based on the VID signals. Various type of VRs may be utilized for the VR 5514. For example, VR 5514 may include a "buck" VR, "boost" VR, a combination of buck and boost VRs, low dropout (LDO) regulators, switching DC-DC regulators, constant-on-time controller-based DC-DC regulator, etc. Buck VR is generally used in power delivery applications in which an input voltage needs to be transformed to an output voltage in a ratio that is smaller than unity. Boost VR is generally used in power delivery applications in which an input voltage needs to be transformed to an output voltage in a ratio that is larger than unity. In some embodiments, each processor core has its own VR, which is controlled by PCU 5510$a/b$ and/or PMIC 5512. In some embodiments, each core has a network of distributed LDOs to provide efficient control for power management. The LDOs can be digital, analog, or a combination of digital or analog LDOs. In some embodiments, VR 5514 includes current tracking apparatus to measure current through power supply rail(s).

In some embodiments, VR 5514 includes a digital control scheme to manage states of a proportional-integral-derivative (PID) filter (also known as a digital Type-III compensator). The digital control scheme controls the integrator of the PID filter to implement non-linear control of saturating the duty cycle during which the proportional and derivative terms of the PID are set to 0 while the integrator and its internal states (previous values or memory) is set to a duty cycle that is the sum of the current nominal duty cycle plus a deltaD. The deltaD is the maximum duty cycle increment that is used to regulate a voltage regulator from ICCmin to ICCmax and is a configuration register that can be set post silicon. A state machine moves from a non-linear all ON state (which brings the output voltage Vout back to a regulation window) to an open loop duty cycle which maintains the output voltage slightly higher than the required reference voltage Vref. After a certain period in this state of open loop at the commanded duty cycle, the state machine then ramps down the open loop duty cycle value until the output voltage is close to the Vref commanded. As such, output chatter on the output supply from VR 5514 is completely eliminated (or substantially eliminated) and there is merely a single undershoot transition which could lead to a guaranteed $V_{min}$ based on a comparator delay and the di/dt of the load with the available output decoupling capacitance.

In some embodiments, VR 5514 includes a separate self-start controller, which is functional without fuse (or NVM) and/or trim information. The self-start controller protects VR 5514 against large inrush currents and voltage overshoots, while being capable of following a variable VID (voltage identification) reference ramp imposed by the system. In some embodiments, the self-start controller uses a relaxation oscillator built into the controller to set the switching frequency of the buck converter. The oscillator can be initialized using either a clock or current reference to be close to a desired operating frequency. The output of VR 5514 is coupled weakly to the oscillator to set the duty cycle for closed loop operation. The controller is naturally biased such that the output voltage is always slightly higher than the set point, eliminating the need for any process, voltage, and/or temperature (PVT) imposed trims.

In some embodiments, device 5500 comprises one or more clock generator circuitries, generally referred to as clock generator 5516. Clock generator 5516 generates clock signals at appropriate frequency levels, which may be supplied to any appropriate components of device 5500. Merely as an example, clock generator 5516 is illustrated to be supplying clock signals to processor 5504 of device 5500. In some embodiments, clock generator 5516 receives one or more Frequency Identification (FID) signals, and generates the clock signals at an appropriate frequency, based on the FID signals.

In some embodiments, device 5500 comprises battery 5518 supplying power to various components of device 5500. Merely as an example, battery 5518 is illustrated to be supplying power to processor 5504. Although not illustrated in the figures, device 5500 may comprise a charging circuitry, e.g., to recharge the battery, based on Alternating Current (AC) power supply received from an AC adapter.

In some embodiments, battery 5518 periodically checks an actual battery capacity or energy with charge to a preset voltage (e.g., 4.1 V). The battery then decides of the battery capacity or energy. If the capacity or energy is insufficient, then an apparatus in or associated with the battery slightly increases charging voltage to a point where the capacity is sufficient (e.g. from 4.1 V to 4.11 V). The process of periodically checking and slightly increase charging voltage is performed until charging voltage reaches specification limit (e.g., 4.2 V). The scheme described herein has benefits such as battery longevity can be extended, risk of insufficient energy reserve can be reduced, burst power can be used as long as possible, and/or even higher burst power can be used.

In some embodiments, battery 5518 is a multi-battery system with workload dependent load-sharing mechanism. The mechanism is an energy management system that operates in three modes—energy saving mode, balancer mode, and turbo mode. The energy saving mode is a normal mode where the multiple batteries (collectively shown as battery 5518) provide power to their own set of loads with least resistive dissipation. In balancing mode, the batteries are connected through switches operating in active mode so that the current shared is inversely proportion to the corresponding battery state-of-charge. In turbo mode, both batteries are connected in parallel through switches (e.g., on-switches) to provide maximum power to a processor or load. In some embodiments, battery 5518 is a hybrid battery which comprising a fast charging battery and a high energy density battery. Fast charging battery (FC) means a battery capable of faster charging than high energy density battery (HE). FC may be today's Li-ion battery as it is capable of faster charging than HE. In some embodiments, a controller (part of battery 5518) optimizes the sequence and charging rate for the hybrid battery to maximize both the charging current and charging speed of the battery, while enabling longer battery life.

In some embodiments, the charging circuitry (e.g., 5518) comprises a buck-boost converter. This buck-boost converter comprises DrMOS or DrGaN devices used in place of half-bridges for traditional buck-boost converters. Various embodiments here are described with reference to DrMOS. However, the embodiments are applicable to DrGaN. The DrMOS devices allow for better efficiency in power conversion due to reduced parasitic and optimized MOSFET packaging. Since the dead-time management is internal to the DrMOS, the dead-time management is more accurate than for traditional buck-boost converters leading to higher efficiency in conversion. Higher frequency of operation allows for smaller inductor size, which in turn reduces the z-height of the charger comprising the DrMOS based buck-boost converter. The buck-boost converter of various embodiments comprises dual-folded bootstrap for DrMOS devices. In some embodiments, in addition to the traditional bootstrap capacitors, folded bootstrap capacitors are added that cross-couple inductor nodes to the two sets of DrMOS switches.

In some embodiments, device 5500 comprises Power Control Unit (PCU) 5510 (also referred to as Power Management Unit (PMU), Power Management Controller (PMC), Power Unit (p-unit), etc.). In an example, some sections of PCU 5510 may be implemented by one or more processing cores 5508, and these sections of PCU 5510 are symbolically illustrated using a dotted box and labelled PCU 5510*a*. In an example, some other sections of PCU 5510 may be implemented outside the processing cores 5508, and these sections of PCU 5510 are symbolically illustrated using a dotted box and labelled as PCU 5510*b*. PCU 5510 may implement various power management operations for device 5500. PCU 5510 may include hardware interfaces, hardware circuitries, connectors, registers, etc., as well as software components (e.g., drivers, protocol stacks), to implement various power management operations for device 5500.

In various embodiments, PCU or PMU 5510 is organized in a hierarchical manner forming a hierarchical power management (HPM). HPM of various embodiments builds a capability and infrastructure that allows for package level management for the platform, while still catering to islands of autonomy that might exist across the constituent die in the package. HPM does not assume a pre-determined mapping of physical partitions to domains. An HPM domain can be aligned with a function integrated inside a dielet, to a dielet boundary, to one or more dielets, to a companion die, or even a discrete CXL device. HPM addresses integration of multiple instances of the same die, mixed with proprietary functions or 3rd party functions integrated on the same die or separate die, and even accelerators connected via CXL (e.g., Flexbus) that may be inside the package, or in a discrete form factor.

HPM enables designers to meet the goals of scalability, modularity, and late binding. HPM also allows PMU functions that may already exist on other dice to be leveraged, instead of being disabled in the flat scheme. HPM enables management of any arbitrary collection of functions independent of their level of integration. HPM of various embodiments is scalable, modular, works with symmetric multi-chip processors (MCPs), and works with asymmetric MCPs. For example, HPM does not need a signal PM controller and package infrastructure to grow beyond reasonable scaling limits. HPM enables late addition of a die in a package without the need for change in the base die infrastructure. HPM addresses the need of disaggregated solutions having dies of different process technology nodes coupled in a single package. HPM also addresses the needs of companion die integration solutions—on and off package.

In various embodiments, each die (or dielet) includes a power management unit (PMU) or p-unit. For example, processor dies can have a supervisor p-unit, supervisee p-unit, or a dual role supervisor/supervisee p-unit. In some embodiments, an I/O die has its own dual role p-unit such as supervisor and/or supervisee p-unit. The p-units in each die can be instances of a generic p-unit. In one such example, all p-units have the same capability and circuits, but are configured (dynamically or statically) to take a role of a supervisor, supervisee, and/or both. In some embodiments, the p-units for compute dies are instances of a compute p-unit while p-units for IO dies are instances of an IO p-unit different from the compute p-unit. Depending on the role, p-unit acquires specific responsibilities to manage power of the multichip module and/or computing platform. While various p-units are described for dies in a multichip module or system-on-chip, a p-unit can also be part of an external device such as I/O device.

Here, the various p-units do not have to be the same. The HPM architecture can operate very different types of p-units. One common feature for the p-units is that they are expected to receive HPM messages and are expected to be able to comprehend them. In some embodiments, the p-unit of IO dies may be different than the p-unit of the compute dies. For example, the number of register instances of each class of register in the IO p-unit is different than those in the p-units of the compute dies. An IO die has the capability of being an HPM supervisor for CXL connected devices, but compute die may not need to have that capability. The IO and computes dice also have different firmware flows and possibly different firmware images. These are choices that an implementation can make. An HPM architecture can choose to have one superset firmware image and selectively execute flows that are relevant to the die type the firmware is associated with. Alternatively, there can be a customer firmware for each p-unit type; it can allow for more streamlined sizing of the firmware storage requirements for each p-unit type.

The p-unit in each die can be configured as a supervisor p-unit, supervisee p-unit or with a dual role of supervisor/supervisee. As such, p-units can perform roles of supervisor or supervisee for various domains. In various embodiments, each instance of p-unit is capable of autonomously managing local dedicated resources and contains structures to aggregate data and communicate between instances to enable shared resource management by the instance configured as the shared resource supervisor. A message and wire-based infrastructure is provided that can be duplicated and configured to facilitate management and flows between multiple p-units.

In some embodiments, power and thermal thresholds are communicated by a supervisor p-unit to supervisee p-units. For example, a supervisor p-unit learns of the workload (present and future) of each die, power measurements of each die, and other parameters (e.g., platform level power boundaries) and determines new power limits for each die. These power limits are then communicated by supervisor p-units to the supervisee p-units via one or more interconnects and fabrics. In some embodiments, a fabric indicates a group of fabrics and interconnect including a first fabric, a second fabric, and a fast response interconnect. In some embodiments, the first fabric is used for common communication between a supervisor p-unit and a supervisee p-unit. These common communications include change in voltage, frequency, and/or power state of a die which is planned based on a number of factors (e.g., future workload, user behavior, etc.). In some embodiments, the second fabric is used for higher priority communication between supervisor p-unit and supervisee p-unit. Example of higher priority communication include a message to throttle because of a possible thermal runaway condition, reliability issue, etc. In some embodiments, a fast response interconnect is used for communicating fast or hard throttle of all dies. In this case, a supervisor p-unit may send a fast throttle message to all other p-units, for example. In some embodiments, a fast response interconnect is a legacy interconnect whose function can be performed by the second fabric.

The HPM architecture of various embodiments enables scalability, modularity, and late binding of symmetric and/or asymmetric dies. Here, symmetric dies are dies of same size, type, and/or function, while asymmetric dies are dies of different size, type, and/or function. Hierarchical approach also allows PMU functions that may already exist on other dice to be leveraged, instead of being disabled in the traditional flat power management scheme. HPM does not assume a pre-determined mapping of physical partitions to domains. An HPM domain can be aligned with a function integrated inside a dielet, to a dielet boundary, to one or more dielets, to a companion die, or even a discrete CXL device. HPM enables management of any arbitrary collection of functions independent of their level of integration. In some embodiments, a p-unit is declared a supervisor p-unit based on one or more factors. These factors include memory size, physical constraints (e.g., number of pin-outs), and locations of sensors (e.g., temperature, power consumption, etc.) to determine physical limits of the processor.

The HPM architecture of various embodiments, provides a means to scale power management so that a single p-unit instance does not need to be aware of the entire processor. This enables power management at a smaller granularity and improves response times and effectiveness. Hierarchical structure maintains a monolithic view to the user. For example, at an operating system (OS) level, HPM architecture gives the OS a single PMU view even though the PMU is physically distributed in one or more supervisor-supervisee configurations.

In some embodiments, the HPM architecture is centralized where one supervisor controls all supervisees. In some embodiments, the HPM architecture is decentralized, wherein various p-units in various dies control overall power management by peer-to-peer communication. In some embodiments, the HPM architecture is distributed where there are different supervisors for different domains. One example of a distributed architecture is a tree-like architecture.

In some embodiments, device 5500 comprises Power Management Integrated Circuit (PMIC) 5512, e.g., to implement various power management operations for device 5500. In some embodiments, PMIC 5512 is a Reconfigurable Power Management ICs (RPMICs) and/or an IMVP (Intel® Mobile Voltage Positioning). In an example, the PMIC is within an IC die separate from processor 5504. The may implement various power management operations for device 5500. PMIC 5512 may include hardware interfaces, hardware circuitries, connectors, registers, etc., as well as software components (e.g., drivers, protocol stacks), to implement various power management operations for device 5500.

In an example, device 5500 comprises one or both PCU 5510 or PMIC 5512. In an example, any one of PCU 5510 or PMIC 5512 may be absent in device 5500, and hence, these components are illustrated using dotted lines.

Various power management operations of device 5500 may be performed by PCU 5510, by PMIC 5512, or by a combination of PCU 5510 and PMIC 5512. For example, PCU 5510 and/or PMIC 5512 may select a power state (e.g., P-state) for various components of device 5500. For example, PCU 5510 and/or PMIC 5512 may select a power state (e.g., in accordance with the ACPI (Advanced Configuration and Power Interface) specification) for various components of device 5500. Merely as an example, PCU 5510 and/or PMIC 5512 may cause various components of the device 5500 to transition to a sleep state, to an active state, to an appropriate C state (e.g., C0 state, or another appropriate C state, in accordance with the ACPI specification), etc. In an example, PCU 5510 and/or PMIC 5512 may control a voltage output by VR 5514 and/or a frequency of a clock signal output by the clock generator, e.g., by outputting the VID signal and/or the FID signal, respectively. In an example, PCU 5510 and/or PMIC 5512 may control battery power usage, charging of battery 5518, and features related to power saving operation.

The clock generator 5516 can comprise a phase locked loop (PLL), frequency locked loop (FLL), or any suitable clock source. In some embodiments, each core of processor 5504 has its own clock source. As such, each core can operate at a frequency independent of the frequency of operation of the other core. In some embodiments, PCU 5510 and/or PMIC 5512 performs adaptive or dynamic frequency scaling or adjustment. For example, clock frequency of a processor core can be increased if the core is not operating at its maximum power consumption threshold or limit. In some embodiments, PCU 5510 and/or PMIC 5512 determines the operating condition of each core of a processor, and opportunistically adjusts frequency and/or power supply voltage of that core without the core clocking source (e.g., PLL of that core) losing lock when the PCU 5510 and/or PMIC 5512 determines that the core is operating below a target performance level. For example, if a core is drawing current from a power supply rail less than a total current allocated for that core or processor 5504, then PCU 5510 and/or PMIC 5512 can temporality increase the power draw for that core or processor 5504 (e.g., by increasing clock frequency and/or power supply voltage level) so that the core or processor 5504 can perform at higher performance level. As such, voltage and/or frequency can be increased temporality for processor 5504 without violating product reliability.

In an example, PCU 5510 and/or PMIC 5512 may perform power management operations, e.g., based at least in part on receiving measurements from power measurement circuitries 5542, temperature measurement circuitries 5540, charge level of battery 5518, and/or any other appropriate information that may be used for power management. To that end, PMIC 5512 is communicatively coupled to one or more sensors to sense/detect various values/variations in one or more factors having an effect on power/thermal behavior of the system/platform. Examples of the one or more factors include electrical current, voltage droop, temperature, operating frequency, operating voltage, power consumption, inter-core communication activity, etc. One or more of these sensors may be provided in physical proximity (and/or thermal contact/coupling) with one or more components or logic/IP blocks of a computing system. Additionally, sensor(s) may be directly coupled to PCU 5510 and/or PMIC 5512 in at least one embodiment to allow PCU 5510 and/or PMIC 5512 to manage processor core energy at least in part based on value(s) detected by one or more of the sensors.

Also illustrated is an example software stack of device 5500 (although not all elements of the software stack are illustrated). Merely as an example, processors 5504 may execute application programs 5550, Operating System 5552, one or more Power Management (PM) specific application programs (e.g., generically referred to as PM applications 5558), and/or the like. PM applications 5558 may also be executed by the PCU 5510 and/or PMIC 5512. OS 5552 may also include one or more PM applications 5556a, 5556b, 5556c. The OS 5552 may also include various drivers 5554a, 5554b, 5554c, etc., some of which may be specific for power management purposes. In some embodiments, device 5500 may further comprise a Basic Input/output System (BIOS) 5520. BIOS 5520 may communicate with OS 5552 (e.g., via one or more drivers 5554), communicate with processors 5504, etc.

For example, one or more of PM applications 5558, 5556, drivers 5554, BIOS 5520, etc. may be used to implement power management specific tasks, e.g., to control voltage and/or frequency of various components of device 5500, to control wake-up state, sleep state, and/or any other appropriate power state of various components of device 5500, control battery power usage, charging of the battery 5518, features related to power saving operation, etc.

In some embodiments, battery 5518 is a Li-metal battery with a pressure chamber to allow uniform pressure on a battery. The pressure chamber is supported by metal plates (such as pressure equalization plate) used to give uniform pressure to the battery. The pressure chamber may include pressured gas, elastic material, spring plate, etc. The outer skin of the pressure chamber is free to bow, restrained at its edges by (metal) skin, but still exerts a uniform pressure on the plate that is compressing the battery cell. The pressure chamber gives uniform pressure to battery, which is used to enable high-energy density battery with, for example, 20% more battery life.

In some embodiments, battery 5518 includes hybrid technologies. For example, a mix of high energy density charge (e.g., Li-Ion batteries) carrying device(s) and low energy density charge carrying devices (e.g., supercapacitor) are used as batteries or storage devices. In some embodiments, a controller (e.g., hardware, software, or a combination of them) is used analyze peak power patterns and minimizes the impact to overall lifespan of high energy density charge carrying device-based battery cells while maximizing service time for peak power shaving feature. The controller may be part of battery 5518 or part of p-unit 5510*b*.

In some embodiments, pCode executing on PCU 5510*a/b* has a capability to enable extra compute and telemetries resources for the runtime support of the pCode. Here pCode refers to a firmware executed by PCU 5510*a/b* to manage performance of the SoC 5501. For example, pCode may set frequencies and appropriate voltages for the processor. Part of the pCode are accessible via OS 5552. In various embodiments, mechanisms and methods are provided that dynamically change an Energy Performance Preference (EPP) value based on workloads, user behavior, and/or system conditions. There may be a well-defined interface between OS 5552 and the pCode. The interface may allow or facilitate the software configuration of several parameters and/or may provide hints to the pCode. As an example, an EPP parameter may inform a pCode algorithm as to whether performance or battery life is more important.

This support may be done as well by the OS 5552 by including machine-learning support as part of OS 5552 and either tuning the EPP value that the OS hints to the hardware (e.g., various components of SoC 5501) by machine-learning prediction, or by delivering the machine-learning prediction to the pCode in a manner similar to that done by a Dynamic Tuning Technology (DTT) driver. In this model, OS 5552 may have visibility to the same set of telemetries as are available to a DTT. As a result of a DTT machine-learning hint setting, pCode may tune its internal algorithms to achieve optimal power and performance results following the machine-learning prediction of activation type. The pCode as example may increase the responsibility for the processor utilization change to enable fast response for user activity, or may increase the bias for energy saving either by reducing the responsibility for the processor utilization or by saving more power and increasing the performance lost by tuning the energy saving optimization. This approach may facilitate saving more battery life in case the types of activities enabled lose some performance level over what the system can enable. The pCode may include an algorithm for dynamic EPP that may take the two inputs, one from OS 5552 and the other from software such as DTT, and may selectively choose to provide higher performance and/or responsiveness. As part of this method, the pCode may enable in the DTT an option to tune its reaction for the DTT for different types of activity.

In some embodiments, pCode improves the performance of the SoC in battery mode. In some embodiments, pCode allows drastically higher SoC peak power limit levels (and thus higher Turbo performance) in battery mode. In some embodiments, pCode implements power throttling and is part of Intel's Dynamic Tuning Technology (DTT). In various embodiments, the peak power limit is referred to PL4. However, the embodiments are applicable to other peak power limits. In some embodiments, pCode sets the Vth threshold voltage (the voltage level at which the platform will throttle the SoC) in such a way as to prevent the system from unexpected shutdown (or black screening). In some embodiments, pCode calculates the Psoc,pk SoC Peak Power Limit (e.g., PL4), according to the threshold voltage (Vth). These are two dependent parameters, if one is set, the other can be calculated. pCode is used to optimally set one parameter (Vth) based on the system parameters, and the history of the operation. In some embodiments, pCode provides a scheme to dynamically calculate the throttling level (Psoc, th) based on the available battery power (which changes slowly) and set the SoC throttling peak power (Psoc, th). In some embodiments, pCode decides the frequencies and voltages based on Psoc, th. In this case, throttling events have less negative effect on the SoC performance Various embodiments provide a scheme which allows maximum performance (Pmax) framework to operate.

In some embodiments, VR 5514 includes a current sensor to sense and/or measure current through a high-side switch of VR 5514. In some embodiments the current sensor uses an amplifier with capacitively coupled inputs in feedback to sense the input offset of the amplifier, which can be compensated for during measurement. In some embodiments, the amplifier with capacitively coupled inputs in feedback is used to operate the amplifier in a region where the input common-mode specifications are relaxed, so that the feedback loop gain and/or bandwidth is higher. In some embodiments, the amplifier with capacitively coupled inputs in feedback is used to operate the sensor from the converter input voltage by employing high-PSRR (power supply rejection ratio) regulators to create a local, clean supply voltage, causing less disruption to the power grid in the switch area. In some embodiments, a variant of the design can be used to sample the difference between the input voltage and the controller supply, and recreate that between the drain voltages of the power and replica switches. This allows the sensor to not be exposed to the power supply voltage. In some embodiments, the amplifier with capacitively coupled inputs in feedback is used to compensate for power delivery network related (PDN-related) changes in the input voltage during current sensing.

Some embodiments use three components to adjust the peak power of SoC 5501 based on the states of a USB TYPE-C device 5529. These components include OS Peak Power Manager (part of OS 5552), USB TYPE-C Connector Manager (part of OS 5552), and USB TYPE-C Protocol Device Driver (e.g., one of drivers 5554*a*, 5554*b*, 5554*c*). In some embodiments, the USB TYPE-C Connector Manager sends a synchronous request to the OS Peak Power Manager when a USB TYPE-C power sink device is attached or detached from SoC 5501, and the USB TYPE-C Protocol Device Driver sends a synchronous request to the Peak Power Manager when the power sink transitions device state. In some embodiments, the Peak Power Manager takes power budget from the CPU when the USB TYPE-C connector is attached to a power sink and is active (e.g., high power device state). In some embodiments, the Peak Power Manager gives back the power budget to the CPU for performance when the USB TYPE-C connector is either detached or the attached and power sink device is idle (lowest device state).

In some embodiments, logic is provided to dynamically pick the best operating processing core for BIOS power-up flows and sleep exit flows (e.g., S3, S4, and/or S5). The selection of the bootstrap processor (BSP) is moved to an early power-up time instead of a fixed hardware selection at any time. For maximum boot performance, the logic selects the fastest capable core as the BSP at an early power-up time. In addition, for maximum power saving, the logic selects the most power efficient core as the BSP. Processor or switching for selecting the BSP happens during the boot-up as well as power-up flows (e.g., S3, S4, and/or S5 flows).

In some embodiments, the memories herein are organized in multi-level memory architecture and their performance is governed by a decentralized scheme. The decentralized scheme includes p-unit 5510 and memory controllers. In some embodiments, the scheme dynamically balances a number of parameters such as power, thermals, cost, latency and performance for memory levels that are progressively further away from the processor in platform or device 5500 based on how applications are using memory levels that are further away from processor cores. In some examples, the decision making for the state of the far memory (FM) is decentralized. For example, a processor power management unit (p-unit), near memory controller (NMC), and/or far memory host controller (FMHC) makes decisions about the power and/or performance state of the FM at their respective levels. These decisions are coordinated to provide the most optimum power and/or performance state of the FM for a given time. The power and/or performance state of the memories adaptively change to changing workloads and other parameters even when the processor(s) is in a particular power state.

In some embodiments, a hardware and software coordinated processor power state policy (e.g., policy for C-state) is implemented that delivers optimal power state selection by taking in to account the performance and/or responsiveness needs of thread expected to be scheduled on the core entering idle, to achieve improved instructions per cycle (IPC) and performance for cores running user critical tasks. The scheme provides the ability to deliver responsiveness gains for important and/or user-critical threads running on a system-on-chip. P-unit 5510 which coupled to the plurality of processing cores, receives a hint from operating system 5552 indicative of a bias towards a power state or performance state for at least one of the processing cores of the plurality of processing cores based on a priority of a thread in context switch.

In some embodiments, use a processor core energy-efficiency core ranking scheme. This is akin to a favored core in a multi-core processor system. However, the favored core (e.g., one of 5508) here is the energy-efficient core that allows the SoC to use the core with the lowest $V_{min}$ for energy-efficiency (e.g., low power consumption). Such $V_{min}$ values may be fused in appropriate registers or stored in NVM during the High-Volume Manufacturing (HVM) process. In some embodiments, an operating system (OS) scheduler can achieve optimal energy performance using the core ranking information to schedule certain applications on the core with lowest $V_{min}$.

In some embodiments, the bootstrap flow identifies the bootstrap processor core (BSP) as the most energy efficiency core of the SoC and assigns the that core the lowest APIC (Advanced processor interrupt controller) ID (identification) value. The APIC ID value that specifies a target processor to receive interrupt delivered in logical destination mode in a local x2APIC. This is a 32-bit value initialized by hardware. While the APIC ID is an Intel Architecture term, a similar function in other processor architectures can also be used to identify a bootstrap processor. Initially, BSP is core0 5508*a* or any core of a multi-core system. In a heterogenous set of cores comprising big cores (or complex and/or high-power applications) and little cores (for less complex and/or low power applications), the BSP can be one of the little cores. This initial BSP is used to identify the EE BSP.

In that context, the microcode (e.g., pCode) or BIOS 5520 (built-in input output system) reads the fuses or NVM that store the per-core $V_{min}$ values. These fuses or NVM are programmed during HVM. Upon reading the fuses or NVM, the microcode or BIOS 5520 calculates and ranks the cores. As such, microcode (e.g., pCode) or BIOS 5520 calculates and ranks core APIC IDs based on efficiency around LFM (low frequency mode) frequencies. Based on the calculated and ranked cores, the microcode or BIOS 5520 transfers BSP ownership to the most efficiency core (e.g., with higher ranking number) by setting a register (e.g., IA32_APIC_BASE.BSP=1).

In some embodiments, the microcode or BIOS 5520 then shares the APIC IDs of the cores ranked based on efficiency to the operation system (or kernel). For example, the microcode or BIOS shares the APIC IDs of the cores ranked based on efficiency to the OS via ACPI (Advanced configuration and power interface) tables such as the MADT (Multiple APIC Description Table).

With the reordered APIC IDs, the OS services low utilization tasks, interrupts, DPCs, efficiently on the core with the lowest $V_{min}$—Note, APIC ID re-ordering also allows for more efficiency HW interrupt routing. In some embodiments, the OS scheduler uses the efficient cores as preferred or favored cores for thread scheduling. If the SoC supports dynamic hardware (HW) feedback, then the pCode (or any suitable microcode or firmware) shares the updated efficiency core ranking via shared memory or MSR (model-specific register) interface.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional elements.

Throughout the specification, and in the claims, the term "connected" means a direct connection, such as electrical, mechanical, or magnetic connection between the things that are connected, without any intermediary devices.

The term "coupled" means a direct or indirect connection, such as a direct electrical, mechanical, or magnetic connection between the things that are connected or an indirect connection, through one or more passive or active intermediary devices.

The term "adjacent" here generally refers to a position of a thing being next to (e.g., immediately next to or close to with one or more things between them) or adjoining another thing (e.g., abutting it).

The term "circuit" or "module" may refer to one or more passive and/or active components that are arranged to cooperate with one another to provide a desired function.

The term "signal" may refer to at least one current signal, voltage signal, magnetic signal, or data/clock signal. The meaning of "a," "an," and "the" include plural references. The meaning of "in" includes "in" and "on."

The term "analog signal" is any continuous signal for which the time varying feature (variable) of the signal is a representation of some other time varying quantity, i.e., analogous to another time varying signal.

The term "digital signal" is a physical signal that is a representation of a sequence of discrete values (a quantified discrete-time signal), for example of an arbitrary bit stream, or of a digitized (sampled and analog-to-digital converted) analog signal.

The term "scaling" generally refers to converting a design (schematic and layout) from one process technology to another process technology and may be subsequently being reduced in layout area. In some cases, scaling also refers to upsizing a design from one process technology to another process technology and may be subsequently increasing layout area. The term "scaling" generally also refers to downsizing or upsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The terms "left," "right," "front," "back," "top," "bottom," "over," "under," and the like in the description and in the claims, if any, are used for descriptive purposes and not necessarily for describing permanent relative positions.

It is pointed out that those elements of the figures having the same reference numbers (or names) as the elements of any other figure can operate or function in any manner similar to that described but are not limited to such.

For purposes of the embodiments, the transistors in various circuits and logic blocks described here are metal oxide semiconductor (MOS) transistors or their derivatives, where the MOS transistors include drain, source, gate, and bulk terminals. The transistors and/or the MOS transistor derivatives also include Tri-Gate and FinFET transistors, Gate All Around Cylindrical Transistors, Tunneling FET (TFET), Square Wire, or Rectangular Ribbon Transistors, ferroelectric FET (FeFETs), or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors (BJT PNP/NPN), BiCMOS, CMOS, etc., may be used without departing from the scope of the disclosure.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well-known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process. The examples can be combined in any combinations. For example, example 4 can be combined with example 2.

Example 1: A machine-readable storage media having machine-readable instructions that when executed cause one or more processors to perform a method comprising: reading fuses or NVM that store Vmin per processor core in a multi-core system; ranking, from a highest ranking to a lowest ranking, each processor core of the multi-core system according to the Vmin per processor core; and modifying an existing bootstrap processor by assigning a new bootstrap processor to a processor core having the highest ranking.

Example 2: The machine-readable storage media of example 1, wherein an operating system schedules interrupts or services low utilization tasks on the processor core having the highest ranking.

Example 3: The machine-readable storage media of example 1, wherein the ranked processor cores have ranked identifications.

Example 4: The machine-readable storage media of example 3 having machine-readable instructions that when executed cause the one or more processors to perform the method comprising: sharing ranked identifications of the processor cores to an operating system.

Example 5: The machine-readable storage media of example 4, wherein the sharing of ranked identifications is via an Advanced Configuration and Power Interface table.

Example 6: The machine-readable storage media of example 5, wherein the Advanced Configuration and Power Interface table comprises a Multiple APIC Description Table.

Example 7: The machine-readable storage media of example 1, wherein ranking each processor core of the multi-core system is further based on efficiency of the processor core around low frequency mode frequencies.

Example 8: The machine-readable storage media of example 1, wherein the fuses or NVM are programmed during high-volume manufacturing with Vmin per processor core.

Example 9: A system-on-chip comprising: a plurality of processor cores; fuses or NVM that store Vmin per processor core from among the plurality of processor cores; and a power management unit coupled to the processor cores, wherein the power management unit is to execute a firmware to: rank each processor core according to the Vmin per processor core; and assign a bootstrap processor to a processor core having a highest ranking.

Example 10: The system-on-chip of example 9, wherein an operating system schedules interrupts or services low utilization tasks on the processor core having the highest ranking.

Example 11: The system-on-chip of example 9, wherein the firmware is to assign ranked processor cores identifications.

Example 12: The system-on-chip of example 11, wherein the firmware is to share the ranked identifications of the processor cores to an operating system.

Example 13: The system-on-chip of example 12, wherein the firmware is to share the ranked identifications via an Advanced Configuration and Power Interface table.

Example 14: The system-on-chip of example 13, wherein the Advanced Configuration and Power Interface table comprises a Multiple APIC Description Table.

Example 15: The system-on-chip of example 9, wherein the firmware is to rank each processor core based on efficiency of the processor core around low frequency mode frequencies.

Example 16: A system comprising: a memory; a processor coupled to the memory; a wireless interface to allow the processor to communicate with another device, wherein the processor includes: a plurality of processor cores, wherein the plurality of processor cores includes heterogenous process cores; fuses or NVM that store Vmin per processor core from among the plurality of processor cores; and a power management unit coupled to the processor cores, wherein the power management unit is to execute a firmware to: rank each processor core with an identification according to the Vmin per processor core; and transfer ownership a bootstrap processor to a processor core having a highest ranking.

Example 17: The system of example 16, wherein an operating system schedules interrupts or services low utilization tasks on the processor core having the highest ranking.

Example 18: The system of example 16, wherein the firmware is to share the ranked identifications of the processor cores to an operating system.

Example 19: The system of example 16, wherein the firmware is to rank each processor core based on efficiency of the processor core around low frequency mode frequencies.

Example 20: The system of example 16, wherein the firmware is to share the ranked identifications via an Advanced Configuration and Power Interface table which comprises a Multiple APIC Description Table.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. A non-transitory machine-readable storage media having machine-readable instructions that when executed cause one or more processors to perform a method comprising:
    reading a minimum operation voltage (Vmin) per processor core in a multi-core system;
    ranking, from a highest ranking to a lowest ranking, each processor core of the multi-core system according to the Vmin per processor core; and
    modifying an existing bootstrap processor by assigning a new bootstrap processor to a processor core having the highest ranking.

2. The machine-readable storage media of claim 1, wherein an operating system schedules interrupts or services low utilization tasks on the processor core having the highest ranking.

3. The machine-readable storage media of claim 1, wherein the ranked processor cores have ranked identifications.

4. The machine-readable storage media of claim 3 having machine-readable instructions that when executed cause the one or more processors to perform the method comprising:
    sharing ranked identifications of the processor cores to an operating system.

5. The machine-readable storage media of claim 4, wherein the sharing of ranked identifications is via an Advanced Configuration and Power Interface table.

6. The machine-readable storage media of claim 5, wherein the Advanced Configuration and Power Interface table comprises a Multiple APIC Description Table.

7. The machine-readable storage media of claim 1, wherein ranking each processor core of the multi-core system is further based on efficiency of the processor core around low frequency mode frequencies.

8. The machine-readable storage media of claim 1, wherein Vmin per processor core are stored in a non-volatile memory which is programmed during high-volume manufacturing with the Vmin per processor core.

9. A system-on-chip comprising:
    a plurality of processor cores;
    memory that stores minimum operating voltage (Vmin) per processor core from among the plurality of processor cores; and
    a power management unit coupled to the processor cores, wherein the power management unit is to execute a firmware to:
    rank each processor core according to the Vmin per processor core; and
    assign a bootstrap processor to a processor core having a highest ranking.

10. The system-on-chip of claim 9, wherein an operating system schedules interrupts or services low utilization tasks on the processor core having the highest ranking.

11. The system-on-chip of claim 9, wherein the firmware is to assign ranked processor cores identifications.

12. The system-on-chip of claim 11, wherein the firmware is to share the ranked identifications of the processor cores to an operating system.

13. The system-on-chip of claim 12, wherein the firmware is to share the ranked identifications via an Advanced Configuration and Power Interface table.

14. The system-on-chip of claim 13, wherein the Advanced Configuration and Power Interface table comprises a Multiple APIC Description Table.

15. The system-on-chip of claim 9, wherein the firmware is to rank each processor core based on efficiency of the processor core around low frequency mode frequencies.

16. A system comprising:
   a memory;
   a processor coupled to the memory;
   a wireless interface to allow the processor to communicate with another device, wherein the processor includes:
      a plurality of processor cores, wherein the plurality of processor cores includes heterogenous process cores;
      one or more memories that store a minimum operating voltage (Vmin) per processor core from among the plurality of processor cores; and
      a power management unit coupled to the processor cores, wherein the power management unit is to execute a firmware to:
         rank each processor core with an identification according to the Vmin per processor core; and
         transfer ownership a bootstrap processor to a processor core having a highest ranking.

17. The system of claim 16, wherein an operating system schedules interrupts or services low utilization tasks on the processor core having the highest ranking.

18. The system of claim 16, wherein the firmware is to share the ranked identifications of the processor cores to an operating system.

19. The system of claim 16, wherein the firmware is to rank each processor core based on efficiency of the processor core around low frequency mode frequencies.

20. The system of claim 16, wherein the firmware is to share the ranked identifications via an Advanced Configuration and Power Interface table which comprises a Multiple APIC Description Table.

* * * * *